(12) United States Patent
Chui et al.

(10) Patent No.: US 6,236,762 B1
(45) Date of Patent: May 22, 2001

(54) SYSTEM AND METHOD FOR UNIFIED DCT AND WAVELET DATA CODING

(75) Inventors: Charles K. Chui, Menlo Park; Lefan Zhong, Santa Clara; James M. Spring, Santa Cruz; Rongxiang Yi, Santa Clara, all of CA (US)

(73) Assignee: PicSurf, Inc., Mountain View, CA (US)

( * ) Notice: Subject to any disclaimer, the term of this patent is extended or adjusted under 35 U.S.C. 154(b) by 0 days.

(21) Appl. No.: 09/118,711

(22) Filed: Jul. 17, 1998

Related U.S. Application Data

(63) Continuation-in-part of application No. 08/958,450, filed on Oct. 27, 1997, now Pat. No. 5,886,651, which is a continuation of application No. 08/758,590, filed on Nov. 27, 1996, now Pat. No. 5,748,116.

(51) Int. Cl.$^7$ ........................................................ G06K 9/36
(52) U.S. Cl. ................... 382/250; 382/240; 375/240.18; 358/432
(58) Field of Search .................................. 382/250–251, 382/240, 244, 245, 248, 232, 246; 341/50, 51, 79; 348/403–408, 398; 358/432–433, 426; 375/240.18–240.2, 240.11, 240.08, 240.24

(56) References Cited

U.S. PATENT DOCUMENTS

| | | | |
|---|---|---|---|
| 5,412,741 | * 5/1995 | Shapiro | 382/232 |
| 5,682,152 | * 10/1997 | Wang et al. | 341/50 |
| 5,740,277 | * 4/1998 | Katto | 382/232 |
| 5,748,116 | * 5/1998 | Chui et al. | 341/50 |
| 5,748,786 | * 5/1998 | Zandi et al. | 382/240 |
| 5,764,807 | * 6/1998 | Pearlman et al. | 382/240 |
| 5,886,651 | * 3/1999 | Chui et al. | 341/50 |
| 5,887,084 | * 3/1999 | Wober et al. | 382/250 |
| 6,101,279 | * 8/2000 | Nguyen et al. | 382/240 |

* cited by examiner

Primary Examiner—Leo H. Boudreau
Assistant Examiner—Ishrat Sherali
(74) Attorney, Agent, or Firm—Pennie & Edmonds LLP

(57) ABSTRACT

A unified system and method for encoding an array of data. If the data array is comprised of DCT data, then coefficients from corresponding positions in the data array are mapped into a common blocks in a second data array so as to group similarly valued coefficients. If the data array is comprised of wavelet data and the wavelet tile is greater than a predetermined size, then the wavelet tile coefficients are mapped into a second array so as to combine coefficients from the same wavelet family. After the DCT or wavelet coefficients have been mapped, the DC coefficients are encoded using a differential pulse code modulation (DPCM) process. The maximum number of bits required to represent any coefficient in each block family in the data array is determined. The difference between the maximum number of bits required to represent any coefficient in the entire data array and each of the block family maximums is determined and encoded. Each block family is then successively divided into an upper leftmost block and a sub-family, and difference values between maximum numbers of component block groupings are determined and encoded. This process is then repeated until the selected sub-family comprises a single block. Whenever a sub-family is processed, if the sub-family is entirely filled with zero data it is so identified in the output data and no further processing of the sub-family is required. After all of the sub-families have been processed, the blocks are bit mask coded. After all the coefficients in a block have been processed, the bit mask is encoded. When blocks of a predetermined size are encountered, the method outputs the value of the coefficients in the block. A data decoder and method retraces the encoded data so as to reverse the process performed by the encoding method.

21 Claims, 19 Drawing Sheets

8 x 8 DCT Arrays 8 x 8 DCT Array

For l = 1,2,3 bl = bl,i,j $$cl = cl,i,j = \begin{bmatrix} c11 & c12 \\ c21 & c21 \end{bmatrix}$$

$$dl = dl,i,j = \begin{bmatrix} d11 & \ldots & d14 \\ \vdots & \ldots & \vdots \\ d41 & \ldots & d44 \end{bmatrix}$$

32 x 32 Tree Coding Array $$A = \begin{bmatrix} a00 & \ldots & a03 \\ . & \ldots & . \\ a30 & \ldots & a33 \end{bmatrix}$$

$$BI = \begin{bmatrix} bI,00 & \ldots & bI,03 \\ . & \ldots & . \\ bI,30 & \ldots & bI,33 \end{bmatrix} \quad I = 1,2,3$$

$$CI = \begin{bmatrix} cI,00 & \ldots & cI,03 \\ . & \ldots & . \\ cI,30 & \ldots & cI,33 \end{bmatrix}$$

$$DI = \begin{bmatrix} dI,00 & \ldots & dI,03 \\ . & \ldots & . \\ dI,30 & \ldots & dI,33 \end{bmatrix}$$

450

| a1 | a2 | b1 | b2 | e11 | e12 | e13 | e14 |
|----|----|----|----|-----|-----|-----|-----|
| c1 | c2 | d1 | d2 | e21 | e22 | e23 | e24 |
| f11 | f12 | f13 | f14 | g11 | g12 | g13 | g14 |
| f21 | f22 | f23 | f24 | g21 | g22 | g23 | g24 |

...

⋮

Rectangular Wavelet Transformed Array

| a1 | b1 | e11 | e12 |
|----|----|-----|-----|
| c1 | d1 | e21 | e22 |
| f11 | f12 | g11 | g12 |
| f21 | f22 | g21 | g22 |

...

⋮

Rearranged Array

470

| a2 | b2 | e13 | e14 |
|----|----|-----|-----|
| c2 | d2 | e23 | e24 |
| f13 | f14 | g13 | g14 |
| f23 | f24 | g23 | g24 |

...

⋮

Rearranged Array

FIG. 4B

SYSTEM AND METHOD FOR UNIFIED DCT AND WAVELET DATA CODING

This application is a continuation in part of U.S. patent application Ser. No. 08/958,450, filed Oct. 27, 1997, now U.S. Pat. No. 5,886,651, which was a continuation of U.S. patent application Ser. No. 08/758,590, filed Nov. 27, 1996, now U.S. Pat. No. 5,748,116.

The present invention relates generally to systems and methods for lossless compression and reconstruction of data, such as the quantized coefficients of a DCT or wavelet transformed image, that is sparsely populated by non-zero data, and particularly to a system and method for efficiently identifying and encoding portions of a DCT or wavelet transformed data set occupied by zero and near-zero values.

BACKGROUND OF THE INVENTION

Sparsely populated data sets are utilized in numerous technical fields. The present invention was developed for efficiently encoding image data that has been transformed by successive applications of wavelet transforms or discrete cosine transforms (DCT), but is equally applicable to other types of sparsely populated data sets. Image data that has been transformed by successive applications of these transforms tends to have large portions occupied by zero and near-zero values, especially if the data is subjected to a data quantization step prior to encoding. Prior art encoding techniques include methods that require all the transform coefficients for an image to be processed together. These techniques require large amounts of memory and are therefore ill-suited for smaller electronic image equipment such as digital cameras.

The primary goals of the present invention are to provide an encoding methodology that (A) encodes wavelet and DCT data with as few data bits as possible, (B) determines the maximum number of data bits required to encode sub-arrays that include at least some non-zero data, and (C) encodes non-zero data with the minimum number of data bits required to losslessly store such data.

Other goals of the present invention are to provide an encoding methodology that uses memory very efficiently, and one that is suitable for implementation in a range of different hardware (i.e., electronic circuitry).

SUMMARY OF THE INVENTION

In summary, the present invention is a unified system and method for encoding an array of data. If the data array is comprised of DCT data, then coefficients from corresponding positions in the data array are mapped into a common blocks in a second data array so as to group similarly valued coefficients. If the data array is comprised of wavelet data and the wavelet tile is greater than a predetermined size (e.g., 32×32), then the wavelet tile coefficients are mapped into a second array so as to combine coefficients from the same wavelet family. After the DCT or wavelet coefficients have been mapped, the DC coefficients are encoded using a differential pulse code modulation (DPCM) process. The maximum number of bits required to represent any coefficient in each block family in the data array is determined. The difference between the maximum number of bits required to represent any coefficient in the entire data array and each of the block family maximums is determined and encoded. A block family is then selected and divided into an upper leftmost block and a sub-family. The difference between the maximum number of bits required to represent any coefficient in the family and the maximum number for the sub-family is determined and encoded. The sub-family is then successively divided into an upper leftmost block and a sub-family. In each iteration, the difference between the maximum number of bits required to represent any coefficient in the parent sub-family and the maximum number for the child sub-family is determined and encoded. For each sub-family where the parent sub-family maximum number equals the child sub-family maximum number, the difference between the parent sub-family maximum number and the maximum number for the upper leftmost block in the parent sub-family is determined and encoded. This process is then repeated until the selected sub-family comprises a single block. Whenever a sub-family is processed, if the sub-family is entirely filled with zero data it is so identified in the output data and no further processing of the sub-family is required.

After all of the sub-families have been processed, the blocks are bit mask coded. Each data entry in the block is compared with the maximum number of bits required to represent a coefficient in the block. If the data entry equals the maximum number the corresponding bit mask entry is set to one, otherwise it is set to zero. The difference between each data entry and the maximum number for the block is also encoded. After all the coefficients in a block have been processed, the bit mask is encoded. When blocks of a predetermined size (e.g., 1×1) are encountered, the method outputs the value of the coefficients in the block.

The data decoding method retraces the encoded data so as to reverse the process performed by the encoding method. The bits of the encoded data are read, in order, in a single pass from the first bit to the last. After the last data bit in the encoded data has been processed, if the data was mapped in the encoding process, then the data entries are mapped back to reconstruct the encoded data array. As the encoded data is read, entries are added to a block list to identify data blocks that will be processed later, along with the data indicating the maximum number of bits needed to encode the data in those data blocks. Data blocks are analyzed in the order they appear in the encoded data. Whenever a data block is processed, if the data block is entirely filled with zero data, the relevant portion of the reconstructed data array is filled with zero data values. Otherwise, data block identifiers are added to the block list until data blocks of a predetermined minimum size (e.g., 1×1) are encountered, at which point the data values in each such data block are decoded and output to the reconstructed data array. The encoder and decoder can be implemented in either hardwired logic or computer software.

BRIEF DESCRIPTION OF THE DRAWINGS

Additional objects and features of the invention will be more readily apparent from the following detailed description and appended claims when taken in conjunction with the drawings, in which:

FIG. 4A illustrates a portion of a large rectangular wavelet transformed array.

FIG. 4B illustrates rearranged arrays consisting of coefficients mapped from the array illustrated in FIG. 4A using a wavelet coefficient mapping method according to an embodiment of the present invention.

DESCRIPTION OF THE PREFERRED EMBODIMENTS

Figure 1:
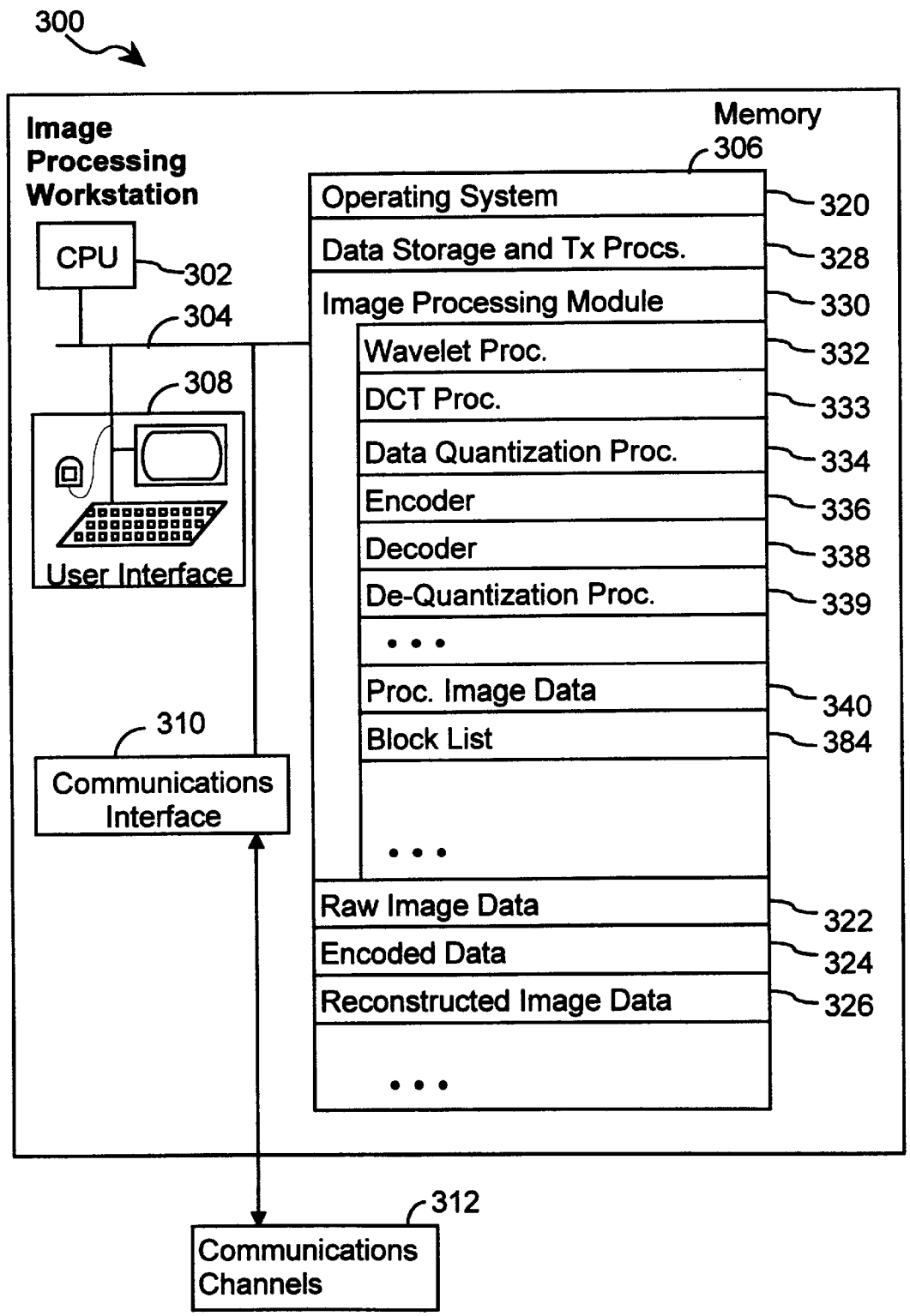
FIG. 1 is a block diagram of an image processing workstation incorporating a first preferred embodiment of the present invention.

Referring to FIG. 1, there is shown a computer system or workstation 300 that incorporates a first preferred embodiment of the present invention. The system 300 includes a central processing unit 302, internal system, control and data busses 304, memory 306 (including random access memory as well as non-volatile memory such as magnetic disk storage), a user interface 308, and a communications interface 310 for transferring information to and from other devices via one or more communication channels 312.

Memory 306 stores both computer software and data, including:

an operating system 320
raw image data 322, such as image data files generated by a digital camera, CAT scan device, MR imaging system, or an image scanner;
encoded data 324, such as compressed image data files generated by a data encoder or data encoding procedure;
reconstructed image data 326, such as reconstructed image data files generated by a data decoder and wavelet data reconstruction procedure; and
procedures 328 for managing the storage, transmission and receipt of data files;
an image processing module 330 for processing image data.

In the first preferred embodiment, the image processing module 330 includes:

a wavelet procedure 332 for transforming arrays of data using wavelet transforms into wavelet analyzed data, and vice versa;
a DCT procedure 333 for transforming arrays of data using DCT transforms into DCT analyzed data, and vice versa;
a data quantization procedure 334 for quantizing the wavelet or DCT analyzed data (also known as wavelet/DCT coefficients) produced by the wavelet procedure 332 or DCT procedure 333;
an encoder procedure 336 for encoding an array of data;
a decoder procedure 338 for decoding a set of encoded data into a corresponding data array;
a data de-quantization procedure 339 for mapping quantized coefficients back into non-quantized coefficients;
processed image data files or storage arrays 340 for temporarily storing wavelet/DCT analyzed data or decoded data; and
block list structure 384 for storing data utilized by the encoder and decoder procedures 336, 338.

As indicated above, the present invention is suitable for use with any sparsely populated data set. For the purposes of explaining the operation of the encoder and decoder procedures, the specific type of wavelet transform procedure 332 or DCT transform procedure 333 used and the specific type of data quantization procedure 334 used to transform an image file into a processed image data file are not relevant and therefore are not further described herein. However, a preferred embodiment of the wavelet transform procedure 332 and a data quantization procedure are described in U.S. patent application Ser. No. 08/758,224, filed Nov. 27, 1996, "System and Method for Performing Wavelet and Inverse Wavelet Like Transformations of Digital Data Using Only Add and Bit Shift Arithmetic Operations," which is hereby incorporated by reference as background information.

Figure 2:
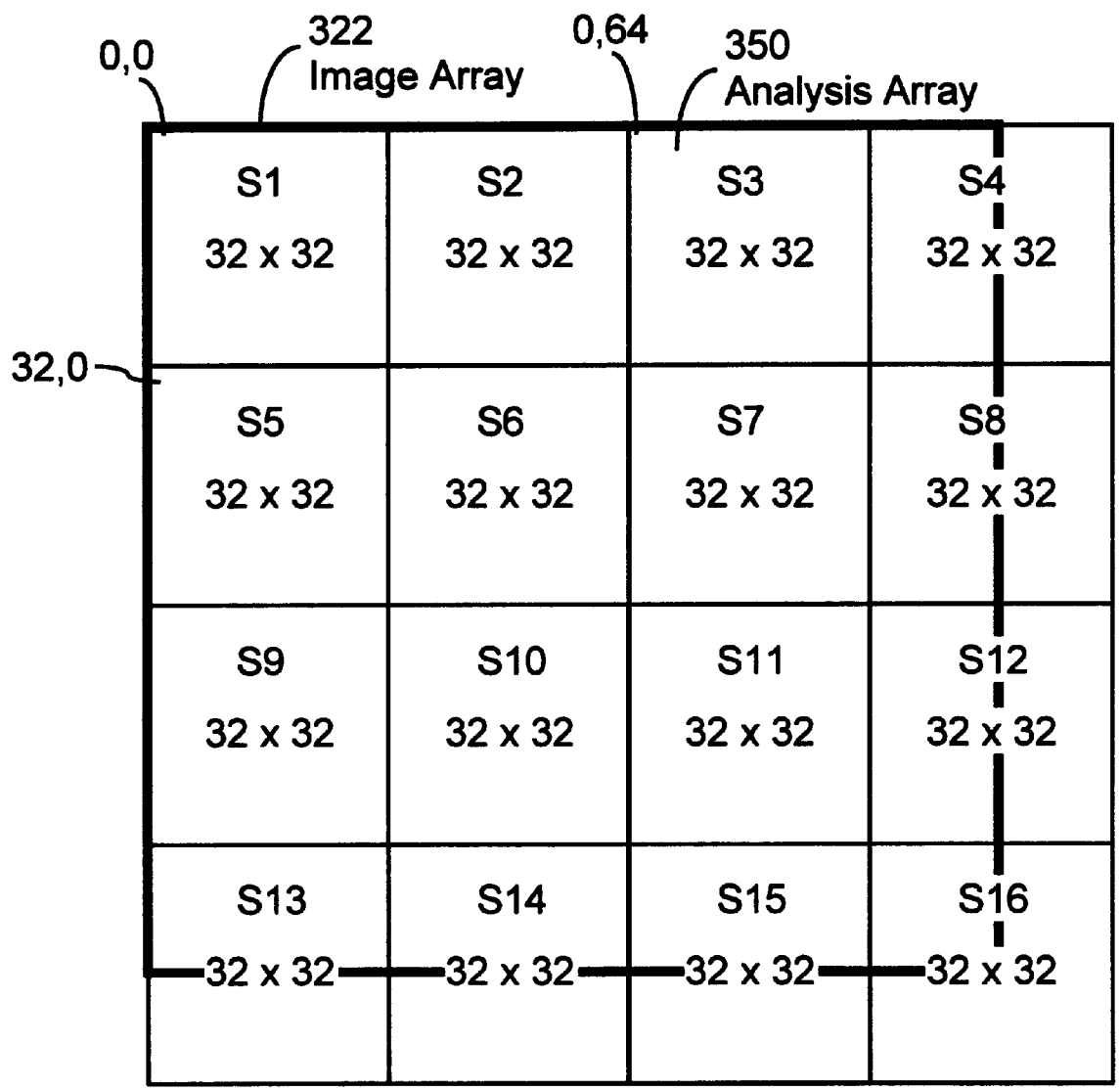
FIG. 2 schematically represents an image data array and an overlapping set of data analysis arrays.

Referring to FIG. 2, there is shown a data array 322 of image data (thick outline), and superimposed thereon is a set of sixteen "analysis arrays" 350. Each analysis array 350 is a square N×N array, such as a 32×32 array. A sufficient number of analysis arrays are used to cover the entire data array 322 that is to be encoded, even if some of the analysis arrays overhang the edges of the data array. The overhanging portions of the analysis arrays are filled with zero data values during the data encoding process. An analysis array size of 32×32 is convenient because an 11×9 set of such analysis arrays perfectly covers a 352×288 data array, which is a fairly commonly used image data array size. In the preferred embodiment, the origin of the data array is the top left corner, the first coordinate used to identify data array positions is the "Y" axis or vertical coordinate, and the second coordinate used is the "X" axis or horizontal coordinate. Thus, a position of 0,64 indicates a pixel at the top vertical position of the array, 64 pixel positions over to the right from the array origin, while a position of 32,0 indicates a pixel on the left edge of the array, 32 pixel positions vertically down from the array origin.

Figure 3A:
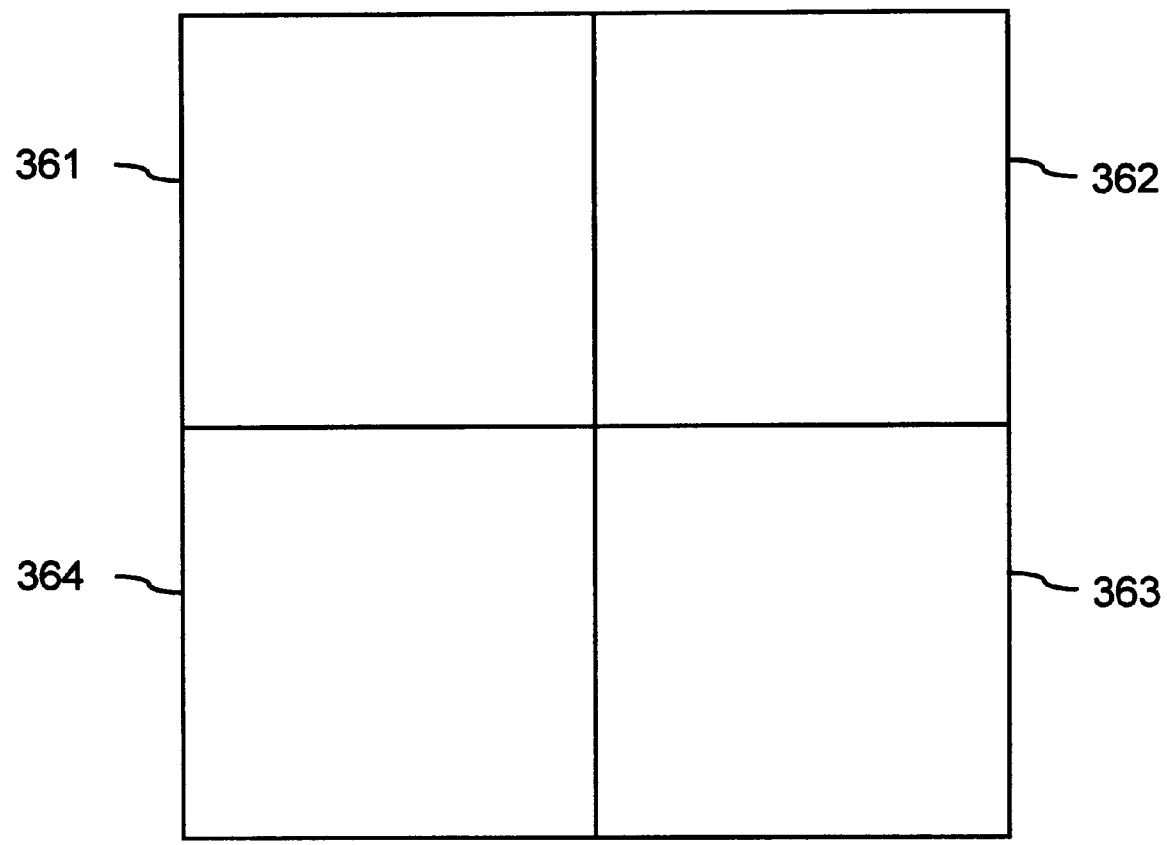
FIG. 3A illustrates four 8×8 discrete cosine transform (DCT) sub-arrays 361–364.
Figure 3B:
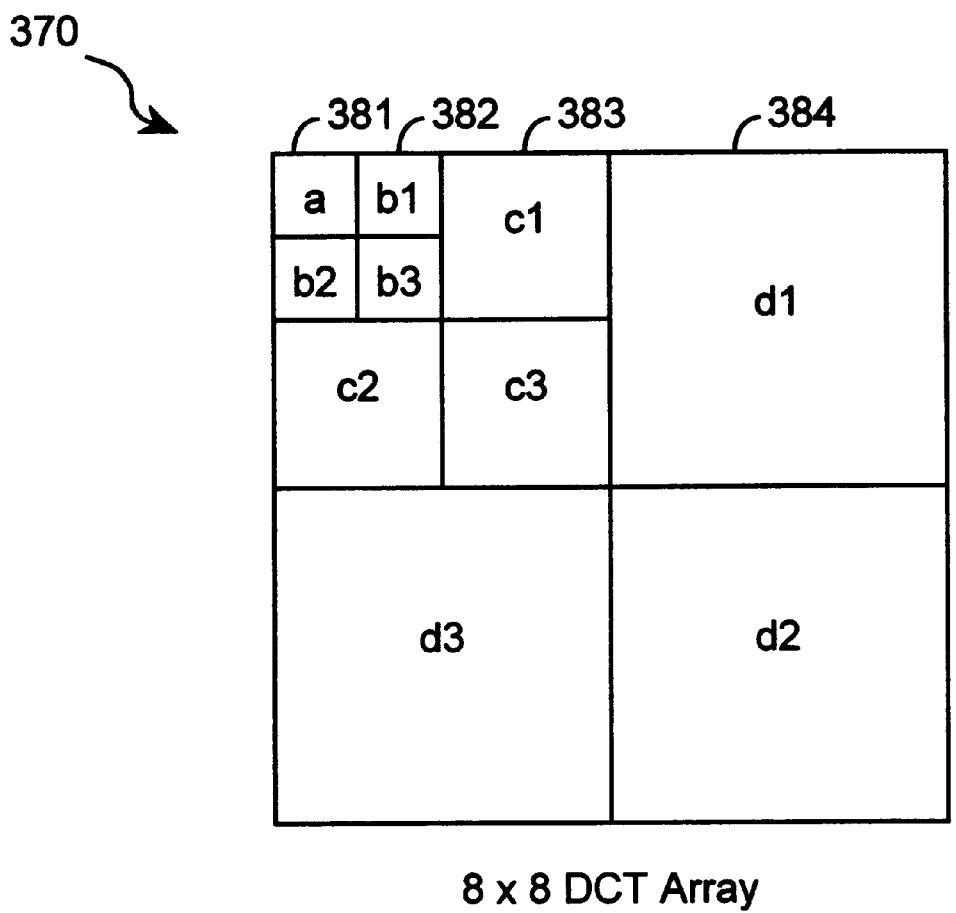
FIG. 3B illustrates a DCT array coefficient classification system according to an embodiment of the present invention.

The unified coding system of the present invention maps coefficients so as to group related coefficients in common blocks to enable the blocks to be encoded using less bits. FIG. 3A illustrates four 8×8 discrete cosine transform (DCT) sub-arrays 361–364. The arrays are generated by performing a DCT on an array of digital image data. In a tree type encoding method of a preferred embodiment of the present invention, each DCT array 361–364 is classified as illustrated in FIG. 3B. Section "a" 381 is comprised of a single coefficient. Section 382 is comprised of three blocks labeled b1–b3 each containing a single coefficient. Section 383 is comprised of three 2×2 blocks labeled c1–c3, and section 384 is comprised of three 4×4 blocks labeled d1–d3.

Figure 3C:
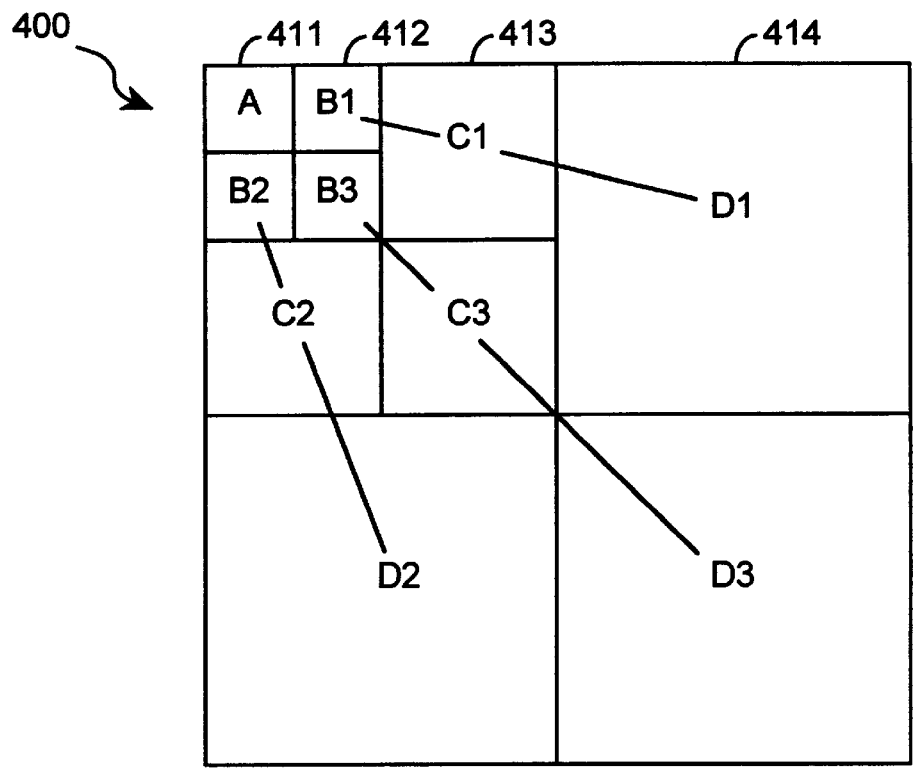
FIG. 3C illustrates a 32×32 tree coding array consisting of coefficients mapped from four DCT arrays of the type illustrated in FIG. 3B.

Each of the 8×8 DCT sub-arrays in an analysis array are mapped into a tree coding array 400 illustrated in FIG. 3C. In a preferred embodiment both the analysis array and the tree coding array are 32×32. The 32×32 analysis array consists of sixteen 8×8 DCT arrays. However, other embodiments can use analysis array of different sizes. For instance, a 16×16 analysis array would include just four 8×8 DCT arrays, while a 64×64 analysis array would include sixty-four 8×8 DCT arrays The upper leftmost coefficient "a" 381 in DCT array 370, is referred to as the DC coefficient. All the other coefficients in the DCT array are AC coefficients. The DC coefficients from all sixteen DCT arrays in the analysis array are mapped in raster scan order into section 411, which consists of a single 4×4 block labeled "A." Similarly each of the coefficients in all of the DCT arrays in the position of the block labeled "b1" in section 382 of DCT array 370, are mapped in raster scan order into the B1 block of section 412 of tree coding array 400. The b2 coefficients and b3 coefficients are similarly mapped into the B2 and B3 blocks. This mapping process is then also applied to the c1, c2, and c3 blocks, which are mapped in raster scan order into the C1, C2 and C3 blocks. The C1, C2 and C3 blocks are each 8×8 blocks. The c1, c2 and c3 blocks each consist of 2×2 groups of coefficients. These 2×2 groups are mapped as a unit. The C1–C3 blocks are thus each an 8×8 block consisting of sixteen 2×2 groups. The same process is also applied at the next level to generate section 414, which consists of three 16×16 blocks D1–D3. The d1–d3 blocks are each 4×4 groups of coefficients, and these groups are mapped in raster scan order into the D1–D3 blocks respectively.

In the tree type coding method described below in conjunction with FIGS. 6–8, the tree coding arrays are processed using block families. For example, in tree coding array 400 blocks B1, C1 and D1 form a block family.

A coefficient mapping method is also applied to wavelet data when the wavelet transform tile is larger than a predefined nested quadratic splitting (NQS) tile size. In a preferred embodiment the NQS tile size is 32×32. A portion of a large rectangular wavelet transformed array 450 is illustrated in FIG. 4A. To more effectively group similarly valued coefficients and thereby improve the image encoding efficiency, coefficients from the same family (also referred to as a wavelet family) are grouped together in rearranged arrays 460 and 470 illustrated in FIG. 4B. As is known by those of ordinary skill in the art, the children of $b_1$ are the $e_{11}$, $e_{12}$, $e_{21}$, $e_{22}$ coefficients, which form a 2×2 array. Similarly the children of $d_1$ are the $g_{11}$, $g_{12}$, $g_{21}$, $g_{22}$ coefficients, which also form a 2×2 array. In one embodiment, each rearranged array consists of a parent coefficient, its three children, and its twelve grandchildren.

Figure 5:
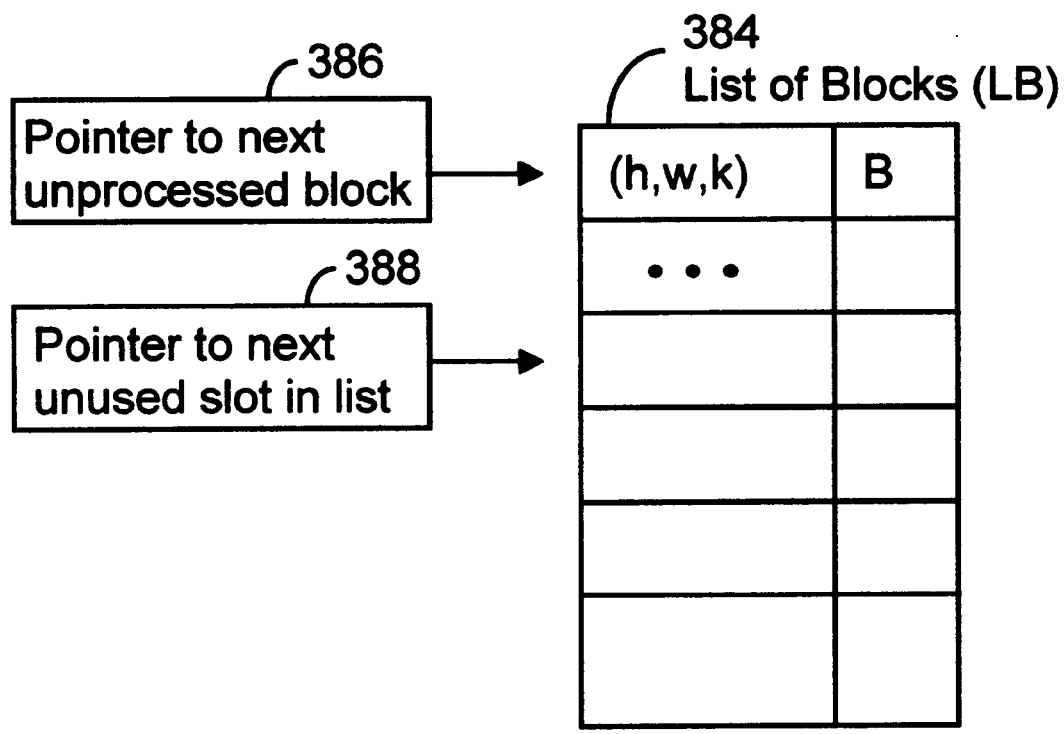
FIG. 5 illustrates a block list data structure used by the data encoder and data decoder of the preferred embodiments.

Referring to FIG. 5 the main "bookkeeping" data structure used by the encoder and decoder procedures is shown. In particular, a list of blocks data structure 384 lists data blocks (i.e., sub-arrays of data) being analyzed. Block list 384 stores two items for each data block: (A) a block identifier consisting of two values indicating the origin of the data block and a value indicating the height and width of the data block, and (B) a value indicating the maximum number of bits required to represent any data value in the data block (i.e., int($\log_2$V)+1, where "int()" represents the integer portion of a specified value). In addition, list 384 has a first pointer 386 that points to the block highest in the list 384 that has not yet been processed, and a second pointer 388 that points to the highest unused slot in the list 384. An alternative embodiment uses arrays without pointers to store the data. The arrays are accessed using recursive routines.

Encoder Procedure

Figure 6:
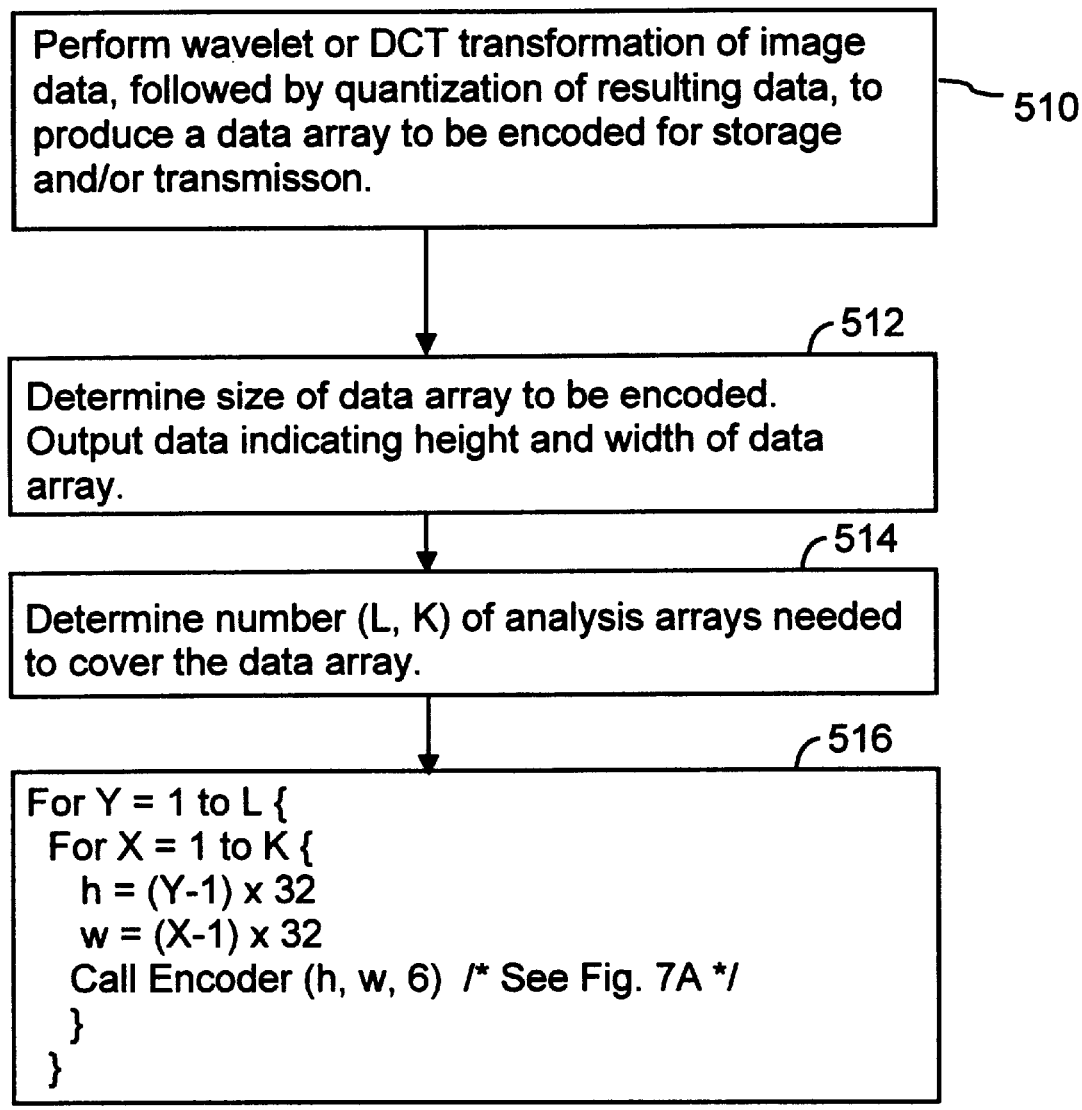
FIGS. 6, 7A 7B and 7C are flow charts of components of a preferred embodiment of the data encoding method of the present invention.

FIGS. 6–8B illustrate a process for mapping and encoding an image that has been divided into a number of analysis arrays. For illustrative purposes the method is described using 32×32 analysis arrays. Referring to FIG. 6, prior to execution of the encoder procedure 336, one or more data preparation procedures are typically performed (step 510). In a preferred embodiment, data preparation consists of performing a wavelet transformation (using wavelet procedure 332) or a DCT transformation (using DCT procedure 333) of an image data array, followed by quantization (using data quantization procedure 334) of the resulting data to a predefined set of discrete data values. The wavelet or DCT transformation and quantization data preparation steps typically generate a data array sparsely populated with non-zero data. However, the encoder procedure is suitable for encoding virtually any data array, including three-dimensional and N-dimensional data arrays.

Table 1 provides definitions of terms and abbreviations used in the flow chart figures.

TABLE 1

| | Definitions of Terms used in Flow Chart Figures |
|---|---|
| node | a single particular position in a data array |
| (h,w,k) | represents a data block whose origin is at y,x = (h,w) and that extends vertically and horizontally $2^k$ positions. |
| (h,w,m) | represents a data block whose origin is at y,x = (h,w) and that extends vertically and horizontally $2^m$ positions. |
| V(h,w) | Absolute value of node (h,w) |
| LB | Block list data structure |
| V(i) | the value of the bit (i) in a bit mask |
| sgn(i,j) | the sign of the data value at the (i,j) node |
| B(i,j) | the maximum number of bits required to encode the absolute value of the (i,j) node (i.e., int($\log_2$V) + 1, where "int()" represents the integer portion of a specified value) |
| B(h,w,k) | the maximum number of bits required to encode the absolute value of any data value in the block, excluding any DC coefficients there may be in the block |
| $B_{BF}$ | the maximum number of bits required to encode the absolute value of any data value in a block family |
| $B_{All}$ | the maximum number of bits required to encode the absolute value of any data value in an analysis array |
| (h,w,k)'s blocks | (h,w,k-1), (h,w+$2^{k-1}$,k-1), (h+$2^{k-1}$,w,k-1), (h+$2^{k-1}$,w+$2^{k-1}$,k-1) |
| nodes of (h,w,1) | (h,w), (h,w+1), (h+1,w) (h+1,w+1) |

Referring to FIG. 6, the encoder procedure begins by determining the height and width of the specified data array to be encoded and outputting those values to the output file (step 512), and then determining the number of analysis arrays needed to cover the specified data array (step 514). For example, when using a 32×32 analysis array, the number of analysis arrays needed may be determined by truncating the five least significant bits from the values of "31+data array height" and "31+data array width". In some applications (e.g., in a digital camera) the height and width may be permanently fixed, in which case steps 512 and 514 may be omitted.

Figure 7A:
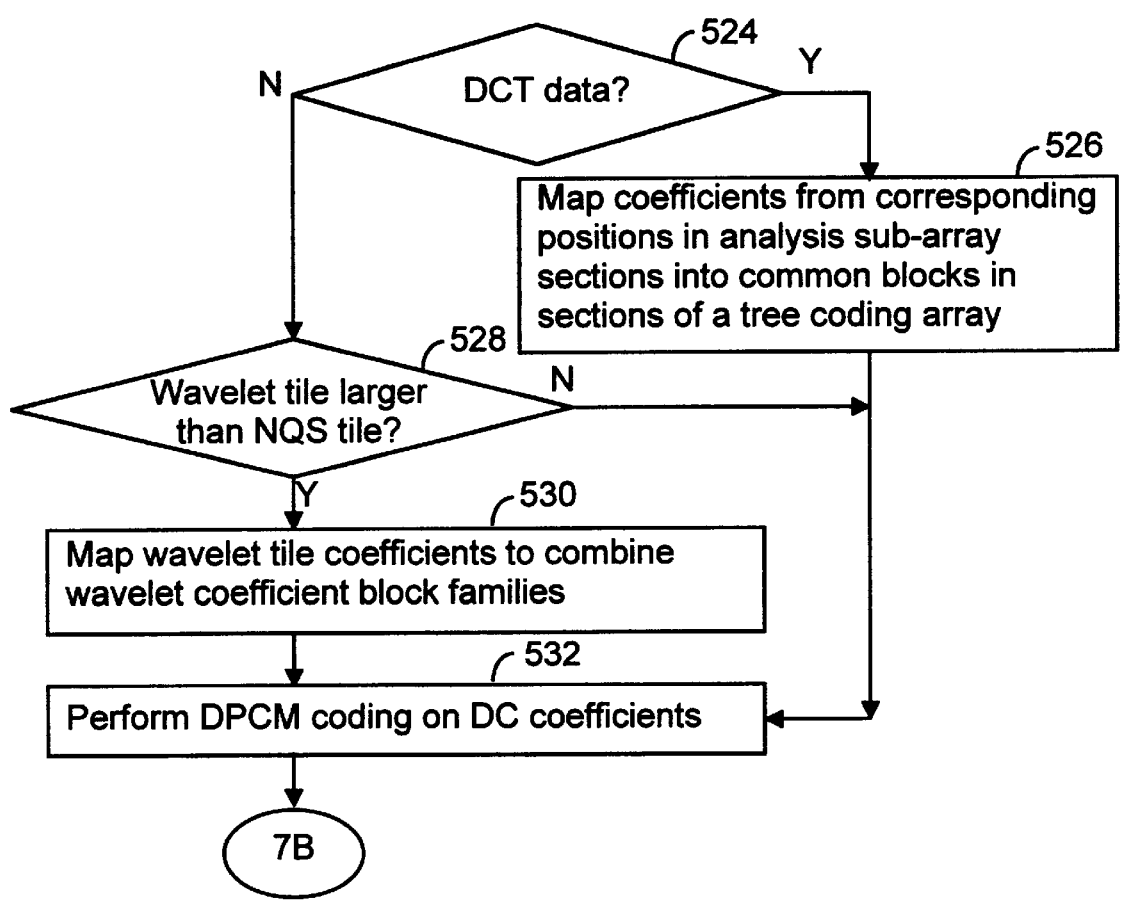

Next, an analysis array encoder procedure (FIGS. 7A–7C) is called successive times to encode each of the analysis arrays required to cover the specified data array (step 516). Referring to FIG. 7A, the procedure for encoding an array of 2"×2" data values begins by remapping the coefficients for the current analysis array into positions for maximizing data compression (steps 524–532). More specifically, the encoder procedure determines whether the data is DCT data (step 524). If the data is DCT data then the coefficients from corresponding positions in the analysis sub-array sections are mapped into common blocks in sections of the rearranged array, as described above in regard to FIGS. 3A–3C (step 526). If the data is wavelet data, then the wavelet tile size is compared with the NQS tile size (step 528). If the wavelet tile size larger than the NQS tile size, then the wavelet tile coefficients are mapped to combine wavelet coefficients from the same block family, as described above in regard to FIGS. 4A and 4B (step 530).

It should be noted that in an alternate embodiment the remapping steps 524–530 could be performed prior to execution of the analysis array encoding loop, step 516. The choice is dictated primarily by the availability, or not, of sufficient memory to perform the remapping for the entire image prior to encode the analysis arrays.

After the mapping of the DCT or wavelet data is performed, or if no mapping is needed, the DC coefficients are encoded using differential pulse code modulation (DPCM) (step 532). In DPCM, first a predictor is selected, as for example described in the JPEG LS standard ISO/IEC SC291WG1 (Final Draft FCD 14495, July 1997), which is hereby incorporated by reference as background information. The difference between each of the DC coefficients and the predictor is then encoded. After the DC coefficients have been encoded, the procedure for encoding an array of 2"×2" data values determines the value of $B_{All}$, which is equal to the maximum number of bits required to encode any data value in the entire array being analyzed (also referred to as a maximum bit), excluding the DC coefficients, and outputs that value using a predefined number of bits (e.g., 4 bits) (step 550). For DCT data, the analysis array is comprised of sixteen 8×8 DCT sub-arrays. If $B_{All}$ is equal to zero (step 552), that indicates that all the nodes (other than the DC coefficients) in the array to be encoded are equal to zero, and therefore the encoding procedure is complete (step 598).

Figure 7B:
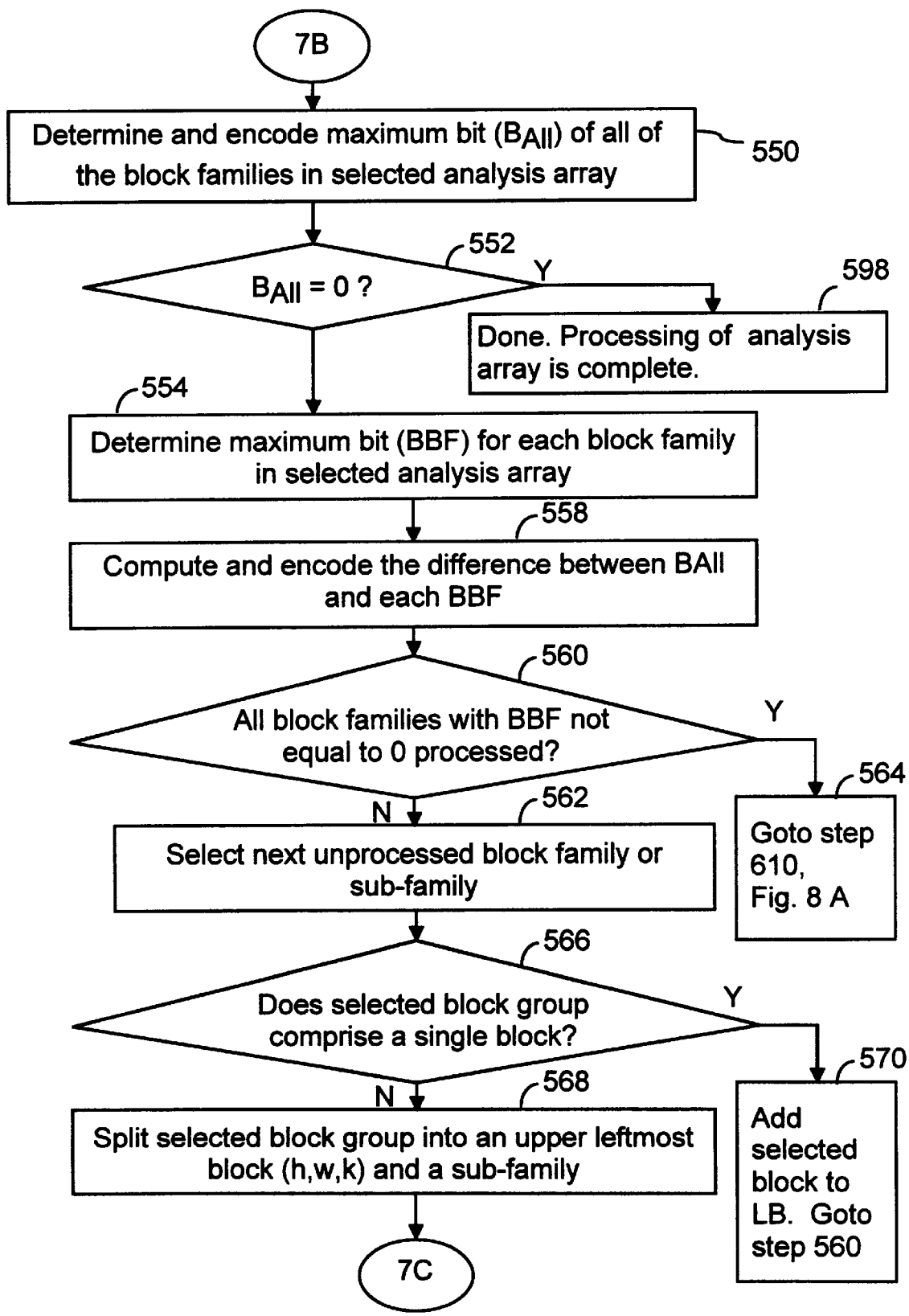
Figure 7C:
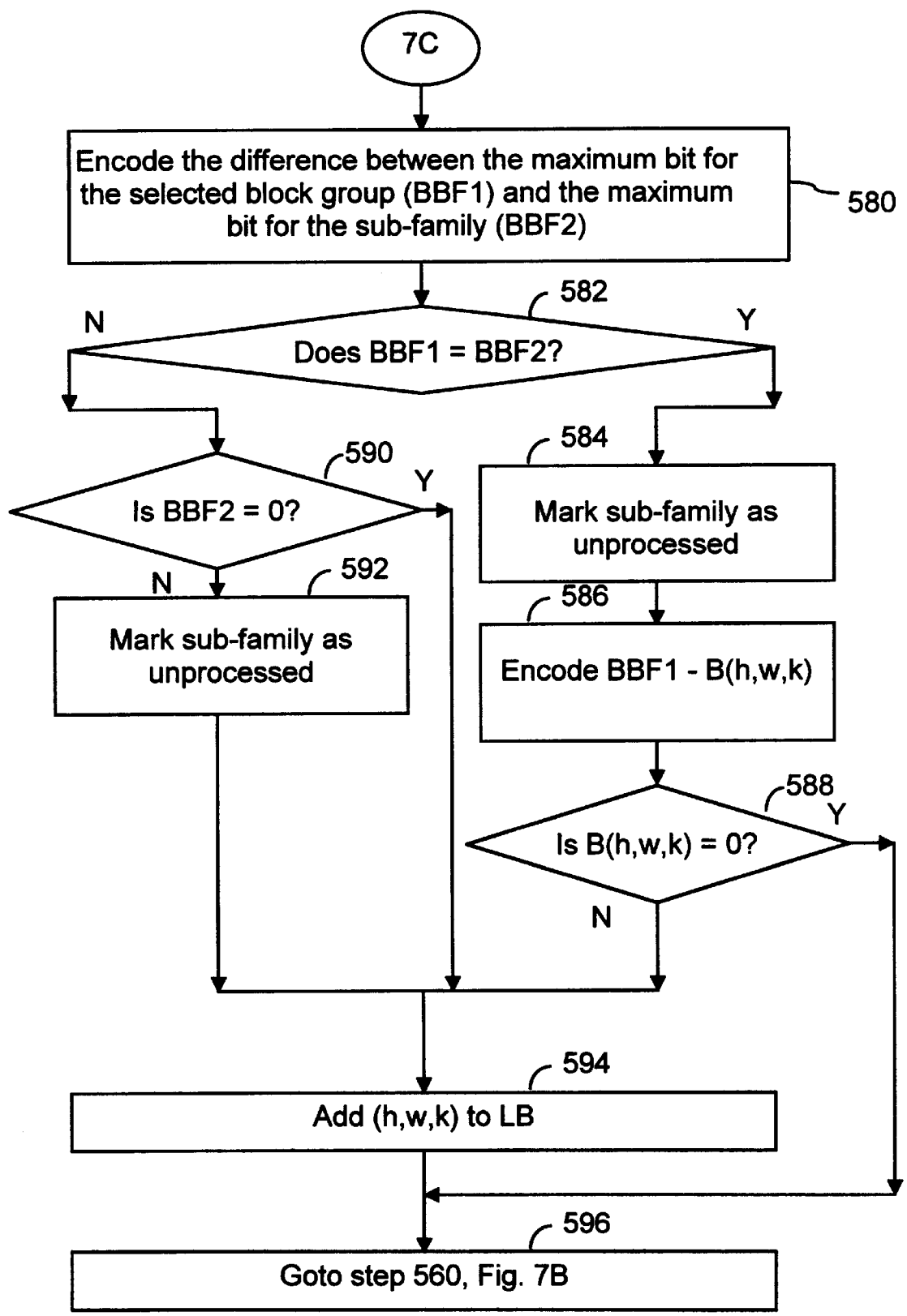

Steps 554–596 of FIGS. 7B and 7C illustrate a tree type encoding method. The maximum number of bits required to represent any single coefficient in a data block family (excluding the DC coefficients) is referred to as $B_{BF}$. The $B_{BF}$ value is determined for each block family in the current analysis array (step 554). The difference between $B_{All}$ and each $B_{BF}$ is then computed and encoded (step 558). If the first two $B_{BF}$ values are not equal to $B_{All}$ then this indicates that the third $B_{BF}$ value is $B_{All}$ and the third difference value does not need to be computed and encoded. The differentials are encoded in a predefined order. A variety of encoding methods may be used to encode the maximum bit values and the maximum bit differential values (e.g., steps 556, 558 and 580), including for example a variable length coding (VLC) method such as Huffman coding. In another embodiment, a VLC encoding table is generated for the image that is used in an adaptive VLC procedure, such as adaptive Huffman coding.

Next, the procedure determines whether all of the block families with non-zero $B_{BF}$ values have been processed (step 560). This is the start of the block processing section of the procedure. A zero $B_{BF}$ value indicates the block family contains all zeroes and therefore does not require further encoding. If all of the block families with non-zero $B_{BF}$ values have been processed, then the procedure continues at step 610 in FIG. 8A, which is the start of the bit mask encoding procedure. If all the non-zero $B_{BF}$ block families have not been processed, then the next block family or sub-family (collectively referred to as a block group) with a non-zero $B_{BF}$ is selected for processing (step 562). After step 562, the procedure determines whether the selected block group (also referred to as a parent sub-family) consists of a single block (step 566). If the selected block group consists of a single block, then the block is added to the block list (step 570) and the procedure continues at step 560. If the selected block group consists of more than a single block, then the block group is split into an upper leftmost block (h,w,k) and a sub-family (also referred to as a child sub-family) (step 568). For example, referring to FIG. 3C, in the first pass of processing analysis array 400, the selected block group may consist of the family of blocks B1, C1 and D1. The upper leftmost block of this family is block B1, and the child sub-family comprises blocks C1 and D1. In the next pass through the block processing section (steps 560–596), depending on whether the values of the respective maximum number of bits (e.g., see steps 582–592), the next block group that is selected for processing may comprise the parent sub-family C1 and D1, and in the following pass the block group may comprise just the D1 block.

After step 568, the procedure encodes the difference between the maximum number of bits required to represent any single coefficient in the selected block group, referred to as $B_{BF1}$, and the maximum number of bits required to represent any single coefficient in the sub-family, referred to as $B_{BF2}$ (step 580, FIG. 7C). If $B_{BF1}$ is equal to $B_{BF2}$ (step 582) then the sub-family is marked as unprocessed (step 584), and the difference between $B_{BF1}$ and B(h,w,k), which in this case is the maximum number of bits required to represent any single coefficient in the upper leftmost block of the selected block group, is encoded (586). If B(h,w,k) is equal to zero (step 588) then the upper leftmost block does not need to be encoded and the procedure continues at step 560 in FIG. 7B to check if there are any block families (or block sub-families) remaining that require processing. If B(h,w,k) does not equal zero then the upper leftmost block (h,w,k) is added to the block list (step 594) and will later be encoded as illustrated in FIGS. 8A and 8B.

After step 582, if $B_{BF1}$ does not equal $B_{BF2}$, then if $B_{BF2}$ does not equal zero (step 590) the sub-family is marked as unprocessed (step 592). Since $B_{BF1}=\max\{B(h,w,k), B_{BF2}\}$, in this circumstance, B(h,w,k) is equal to $B_{BF1}$. After step 592, or it $B_{BF2}$ does equal zero, then the upper left most block (h,w,k) is added to the block list (step 594) and the procedure continues at step 560 in FIG. 7B to check if there are any block families or block sub-families remaining that require processing.

Figure 8A:
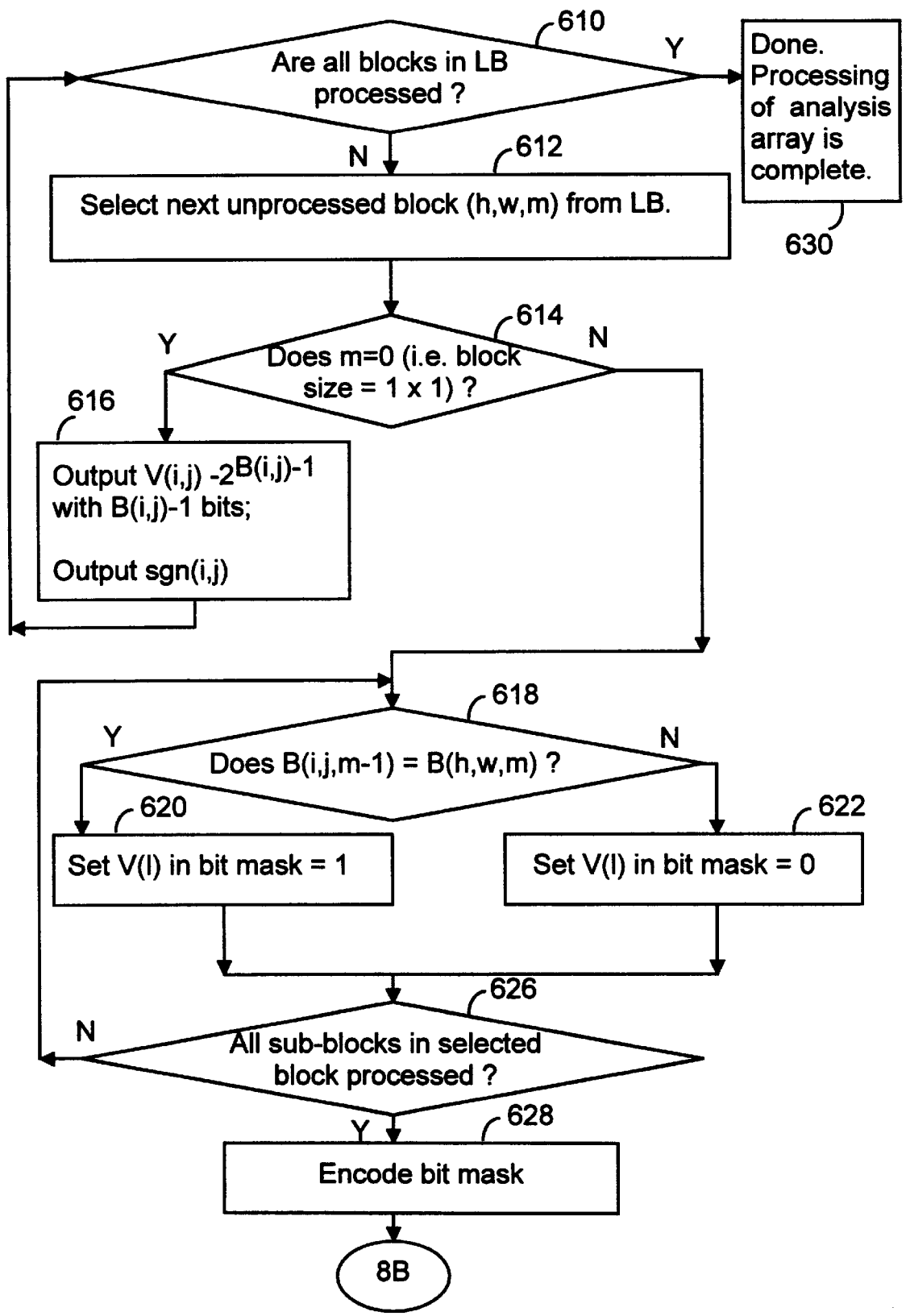
FIGS. 8A and 8B are a flow chart of a nested quadratic splitting (NQS) sparse data encoding method using bit masks according to a preferred embodiment of the present invention.
Figure 8B:
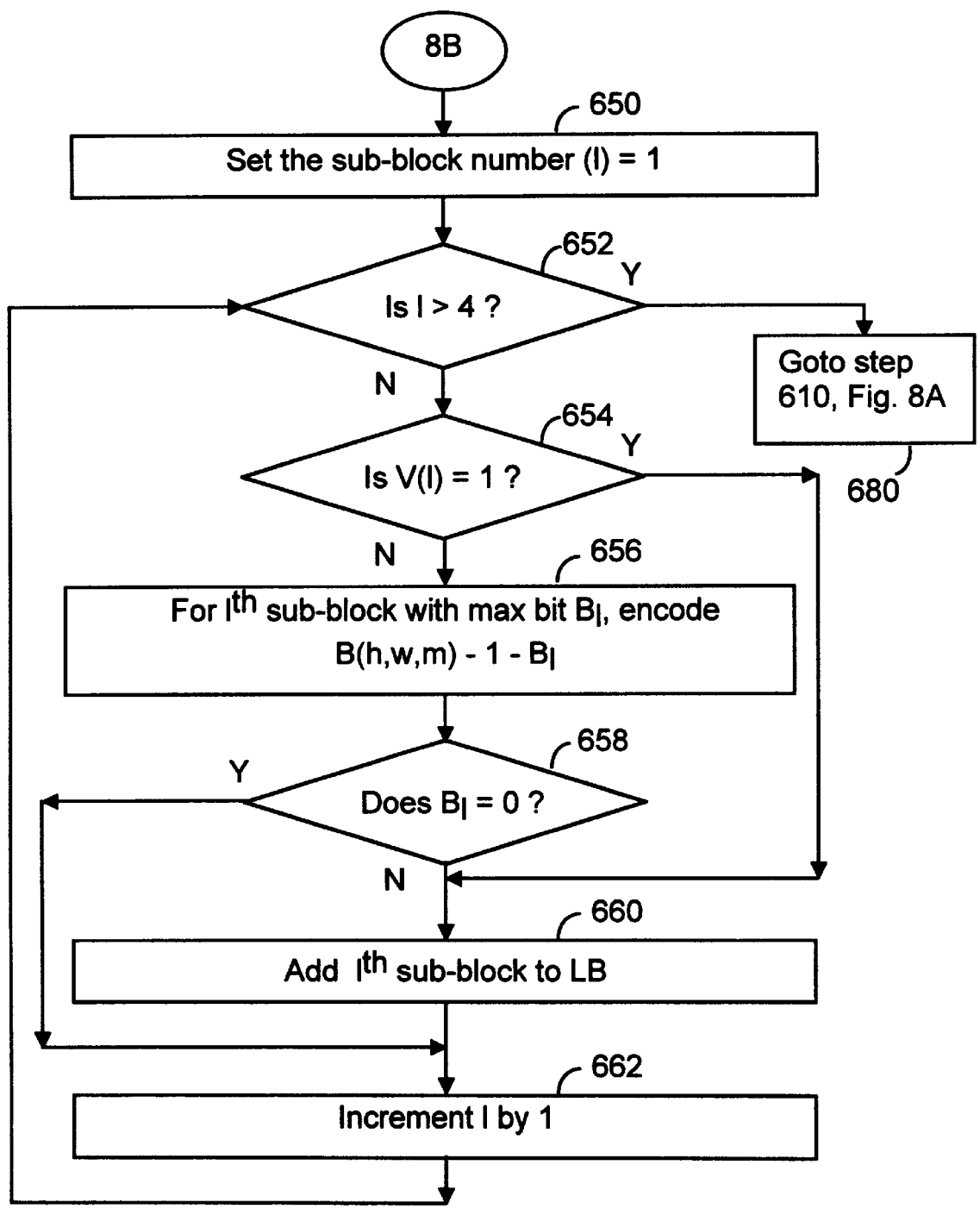

FIGS. 8A and 8B illustrate the bit mask encoding procedure of a preferred embodiment of the present invention. After all of the block families and sub-families in the analysis array have been processed, the procedure branches from step 560 in FIG. 7B to step 610 in FIG. 8A. First the procedure checks whether all of the blocks in the block list have been processed (step 610). When all the blocks have been processed, processing of the analysis array is complete (step 630) and the procedure is repeated for the next unprocessed analysis array in the image that is being encoded.

When there are unprocessed blocks in the block list, the next unprocessed block (h,w,m) is selected (step 612). If the selected block is the minimum block size, which in a preferred embodiment is 1×1 (step 614), then the procedure outputs the value $V(i,j)-2^{B(i,j)-1}$ using B(i,j)−1 bits and also outputs sgn(i,j) (step 616). In alternate embodiments in which the minimum block size is larger than 1×1, the procedure outputs the values of each of the nodes in the blocks, using B(i,j)+1 bits to represent each non-zero value and B(i,j) bits to represent each zero value.

After step 614, if the selected block is larger than the minimum block size, then the block is divided into four subblocks. A bit mask having four bits is used to represent whether B(i,j,m−1) of each subblock is equal to B(h,w,m) of the selected block. First B(i,j,m−1), the maximum number of bits required to encode values in a selected subblock, is compared with B(h,w,m), the maximum number of bits required to encode the absolute value of any data value in the selected block. If B(i,j,m−1) equals B(h,w,m) then a one is entered in the bit mask position V(I) (step 620).

If B(i,j,m−1) is not equal to B(h,w,m) then the corresponding position in the bit mask, V(I), is set equal to zero (step 622). After steps 620 or 622, if there are any remaining subblocks in the block to be processed (step 626) the bit mask encoding processes is repeated, starting at step 618. After all the subblocks in the block have been processed, the decimal value of the bit mask is encoded (step 628). In a preferred embodiment, the bit mask is encoded using a pre-defined variable length coding (VLC) procedure, such as Huffman coding. Since the arithmetic value of the bit mask cannot, by definition, be equal to zero, variable length coding will reduce storage requirements on average. The bit mask can also be arithmetically encoded.

The procedure continues in FIG. 8B with the encoding of "remainder values" associated with the bit mask, as will be explained next. The sub-block number (I) is set equal to one (step 650). The procedure then enters a loop (step 652) in which each of the four sub-blocks are processed. If the bit mask data entry, V(I), is equal to one (step 654) this indicates the corresponding maximum number of bits (denoted as $B_I$ in FIG. 8B) required to encode the absolute value of any data value in the corresponding subblock entry, is equal to B(h,w,m) and therefore there is no remainder and the procedure continues at step 660. $B_I$ is equal to B(i,j,m−1) for the subblock being processed.

If the bit mask data entry, $b_I$, is not equal to one then the remainder value $$B(h,w,k)-1-B_I,$$

is encoded using a variable length code (step 656). The remainder value represents the difference between the maximum number of bits needed for the block and the maximum number of bits needed for the sub-block. One is subtracted from B(h,w,k) because $B_I$ must be less than B(h,w,k). If $B_I$ does not equal zero (step 658) then the current sub-block is added to the block list (step 660). If $B_I$ equals zero this indicates the sub-block is zero valued (step 658), and the sub-block number is incremented by one (step 662). If sub-block number is not greater than four, then the sub-block remainder encoding loop is repeated starting at step 652. After each of the four sub-blocks have been processed the procedure continues at step 610 in FIG. 8A (step 680).

In another embodiment, in place of the procedure of FIGS. 8A and 8B, the transformed data is encoded using one of the nested quadratic splitting (NQS) encoding methods described in U.S. patent application Ser. No. 08/958,450 filed Oct. 27, 1997, "System and Method for Nested Split Coding of Sparse Data Sets," which is hereby incorporated by reference as background information. In a further alternative embodiment, a bit mask coding method is used to encode the differences between the maximum numbers of bits required to represent any coefficient in a data block family, as shown in FIG. 7A.

The unified coding system of the present invention typically provides 20% better compression than the current JPEG compression standard.

Decoder Procedure

Referring to FIGS. 9A–11B, the decoder procedure 338 (FIG. 1) works, in general, by reading and interpreting the encoded data so as to reverse the process performed by the encoder procedure 336. The bits of the encoded data are read, in order, in a single pass from the first bit to the last.

As the encoded data is read, entries are added to the block list to identify the data blocks and sub-blocks that will be processed later in the procedure, along with the data indicating the maximum number of bits needed to encode the data in those blocks and sub-blocks. Data blocks and sub-blocks are analyzed in the order they appear in the encoded data. Whenever a sub-block is processed, if the sub-block is entirely filled with zero data (i.e., data values all equal to zero), the relevant portion of the reconstructed data array is filled with zero data values. Otherwise, sub-block identifiers are added to the block list until sub-blocks whose size is 1×1 are encountered, at which point the value in the sub-block is decoded and output to the analysis data arrays. For data that was mapped in the encoding process, the coefficients are mapped back and the final decoding steps are performed to reconstruct the image data.

Figure 9A:
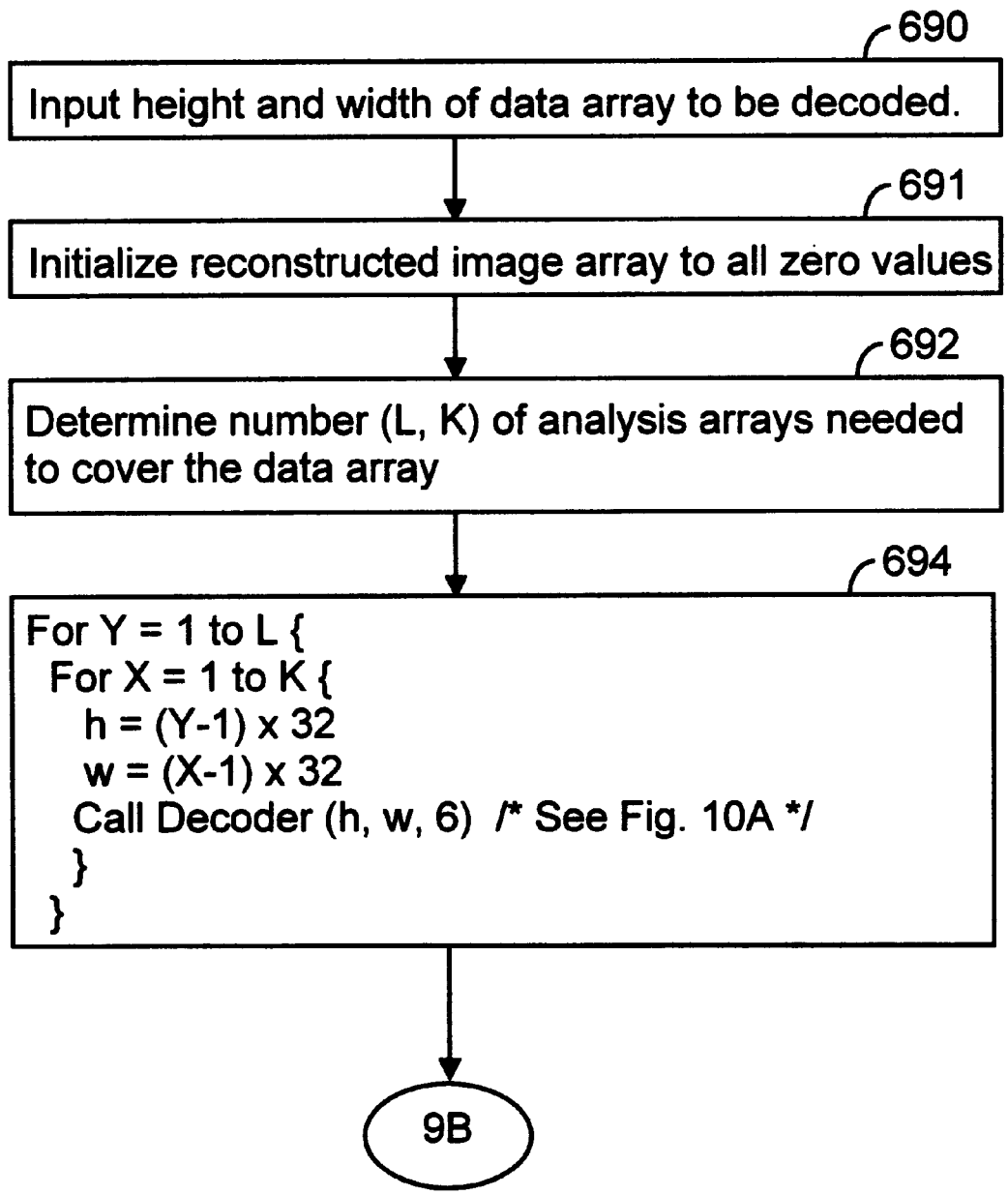
FIGS. 9A, 9B, 10A and 10B are flow charts of components of a preferred embodiment of the data decoding method of the present invention.

Referring to FIG. 9A, the decoder procedure begins by reading (inputting) from the encoded data the height and width of the data array to be decoded and reconstructed (step 690), initializing the reconstructed image array to all zero values (step 691), and then determining the number of analysis arrays needed to cover the specified data array (step 692). Then, an analysis array decoder procedure (shown in FIGS. 10A through 11B) is called successive times to decode each of the analysis arrays required to cover the specified data array (step 694).

Figure 10A:
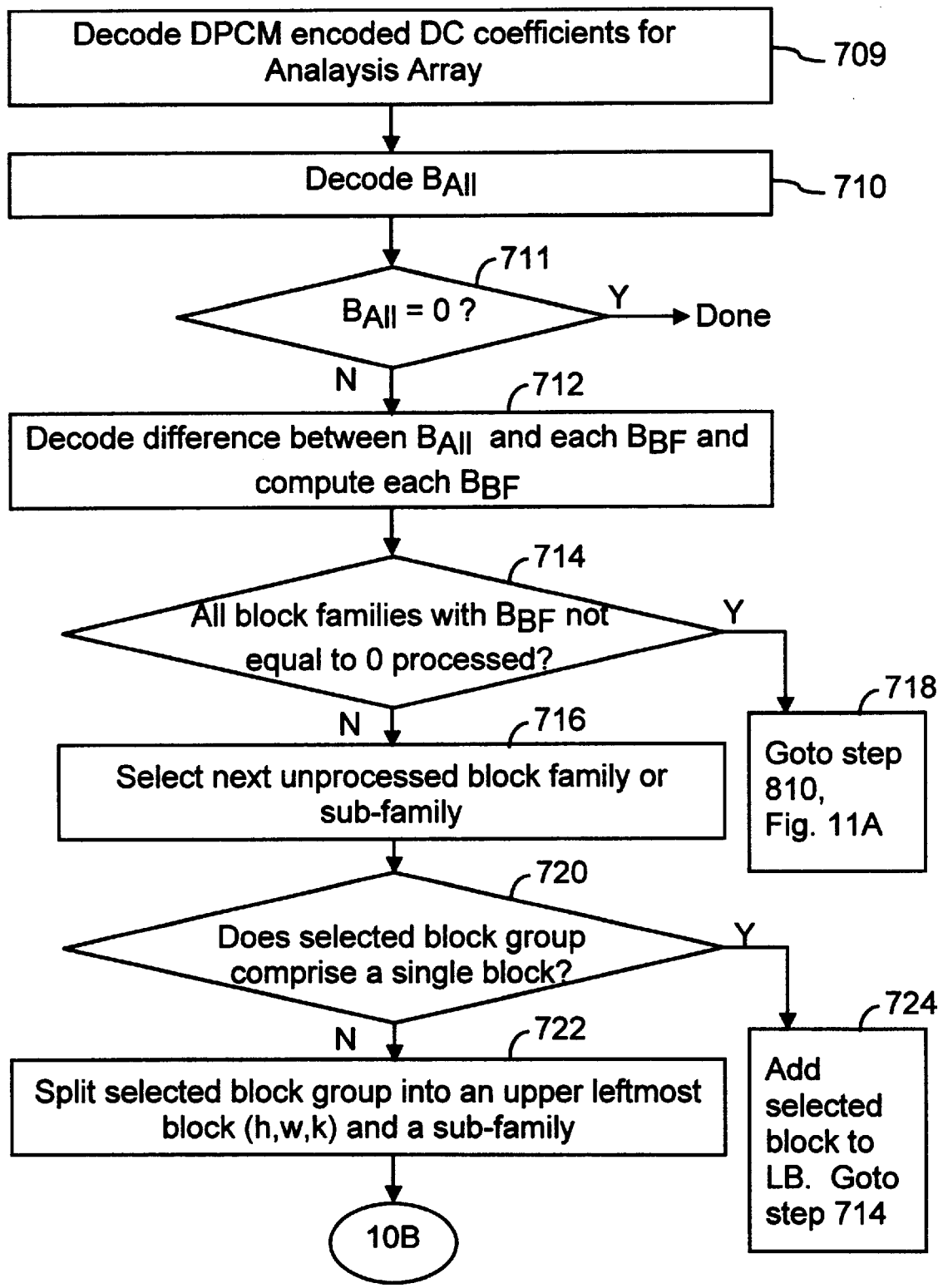
Figure 10B:
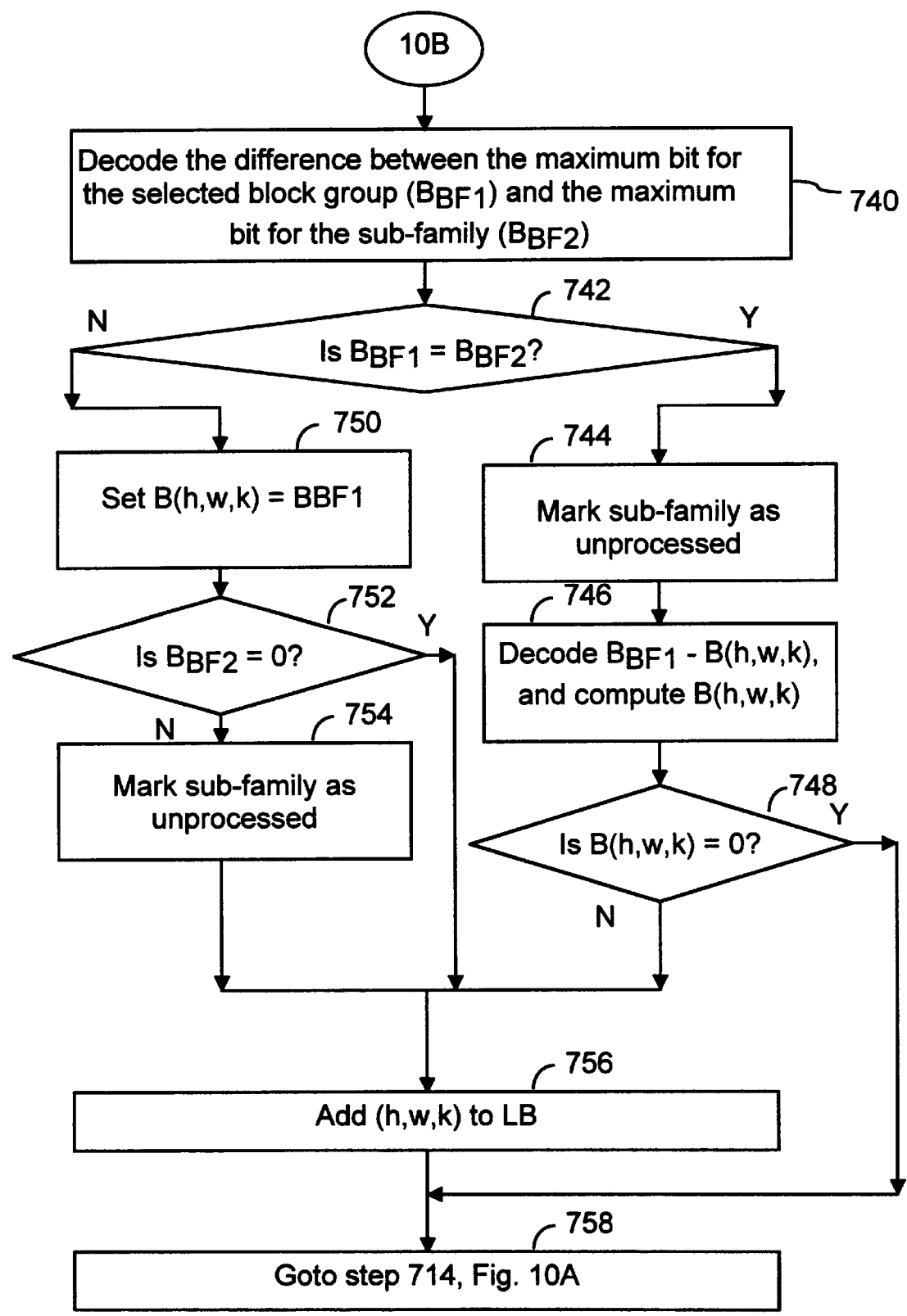

FIGS. 10A and 10B illustrate a tree type decoding procedure according to a preferred embodiment of the present invention. Referring to FIG. 10A, the DC coefficients for the current analysis array are decoded (step 709). In an alternate embodiment, the DC coefficients in all the analysis arrays are decoded first, prior to the analysis array decoding loop of step 694. The resulting DC coefficients can be used to generate a thumbnail representation of the image prior to the decoding of the remaining data in the encoded image file.

Continuing with the analysis array decoder procedure, the maximum number of bits required to represent any single coefficient in all of the data block families, $B_{All}$, is decoded (step 710). If $B_{All}$ is equal to zero (step 711), all the non-DC coefficients in the analysis array are equal to zero, in which case decoding of the analysis array is complete, and the decoding processing moves onto the next analysis array, if any (see FIG. 9A).

The difference between $B_{All}$ and each $B_{BF}$ is then decoded and the value of each $B_{BF}$ is computed (step 712). Step 714 begins the decoding process for each block family. At the start of the decoding process the analysis array is comprised of all zero data entries, and the array is organized using the data structure illustrated by array 400 in FIG. 3C. An unprocessed block family is then selected (step 716). In the first pass through the procedure, the block family comprises three blocks $B_n$, $C_n$ and $D_n$. When the block group consists of a single block (step 720) the tree type decoding procedure for that block family is complete. The selected block is then added to the block list (step 724) and the procedure checks for remaining unprocessed block families (step 714). After all of the block families with non-zero $B_{BF}$ values are processed the procedure jumps to step 810 in FIG. 11A to start the bit mask decoding procedure.

After step 720, if the selected block group consists of more than a single block, then the selected block group is split into an upper leftmost block (h,w,k) and a sub-family (step 722). Referring to FIG. 10B, next the difference between the maximum bit for the selected block group ($B_{BF1}$) and the maximum bit for the sub-family ($B_{BF2}$) is decoded (step 740). If $B_{BF1}$ is equal to $B_{BF2}$ (step 742) then the sub-family is marked as unprocessed (step 744). The difference between $B_{BF1}$ and B(h,w,k) is then decoded, and the value of B(h,w,k) is computed from this difference and the value of $B_{BF1}$ (step 746). If B(h,w,k) is equal to zero (step 748) this indicates the block contains all zeroes and therefore does not require further decoding. The procedure then continues at step 758. If B(h,w,k) does not equal zero (step 748), then the block is added to the block list for further decoding (step 756).

After step 742, if $B_{BF1}$ does not equal $B_{BF2}$, then B(h,w,k) is set equal to $B_{BF1}$ (step 750). If $B_{BF2}$ equals zero then the selected sub-family does not require further processing and the (h,w,k) block is added the block list (step 756). If $B_{BF2}$ does not equal zero than the sub-family is marked as unprocessed (step 754), and the (h,w,k) block is added the block list (step 756). The block family decoding procedure then continues at step 714 in FIG. 10A.

Figure 11A:
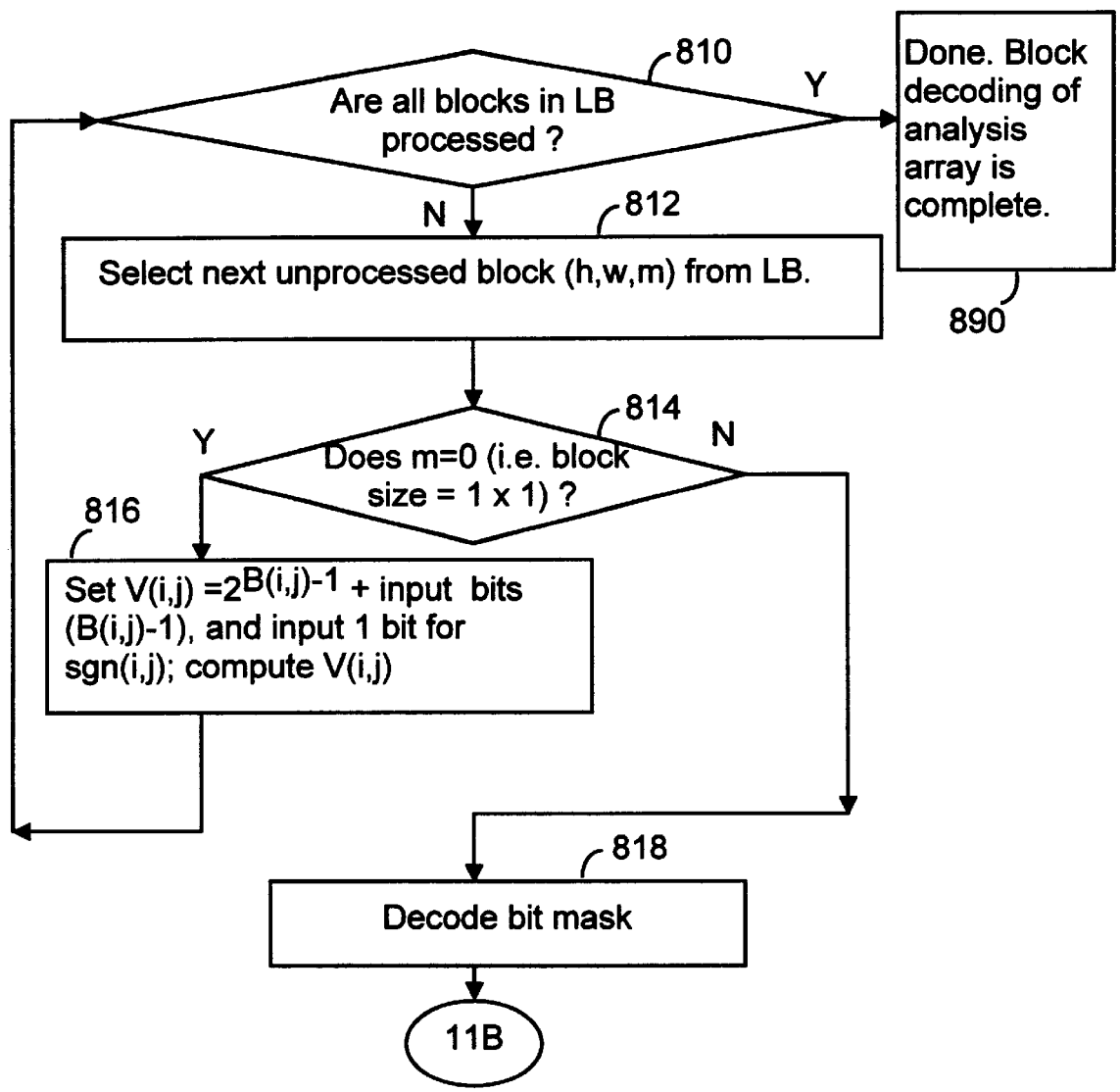
FIGS. 11A and 11B are flow charts of a nested quadratic splitting (NQS) sparse data decoding method using bit masks according to a preferred embodiment of the present invention.
Figure 11B:
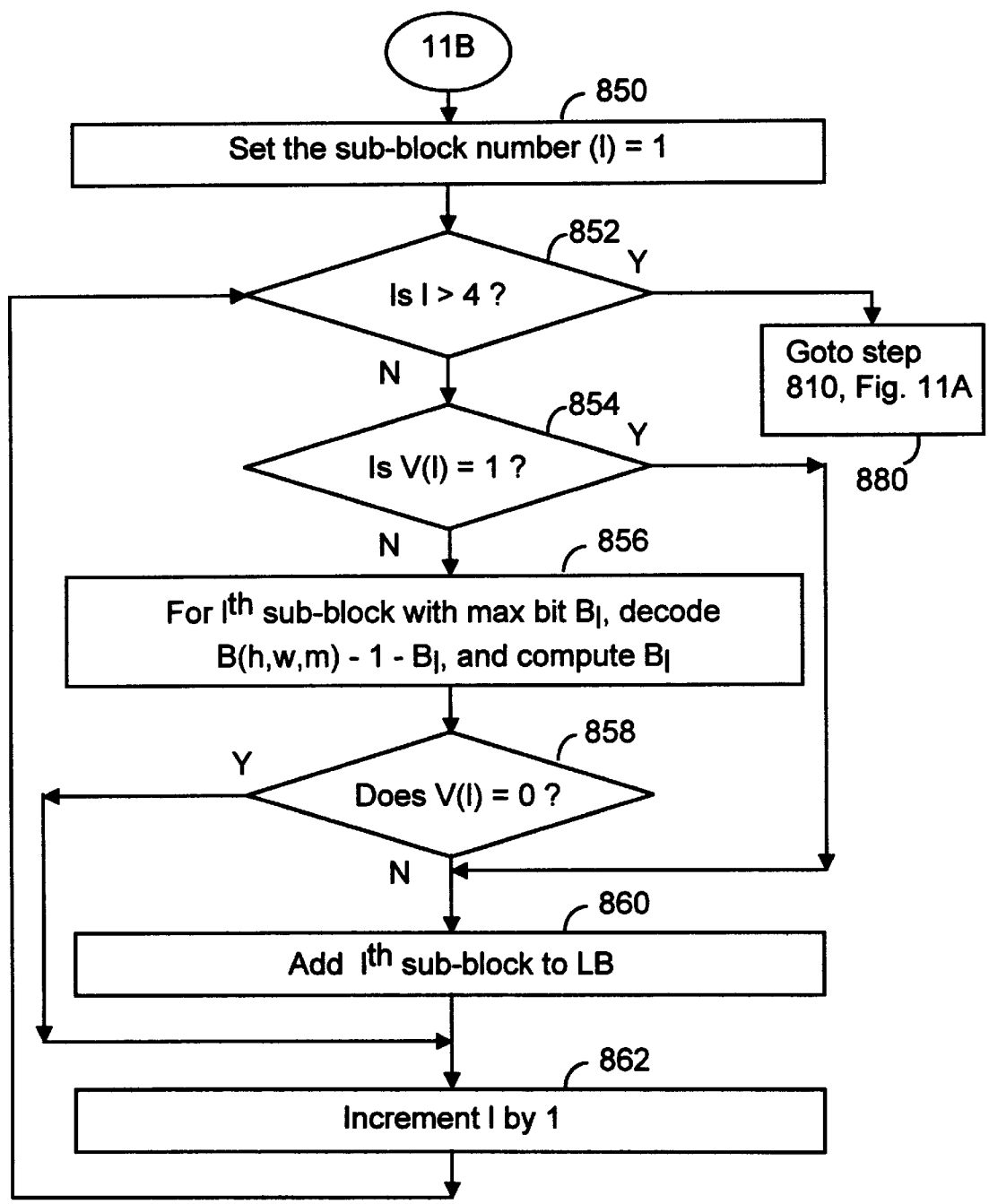

After the tree-type block family decoding procedure is complete, the individual blocks are re-constructed using the nested quadratic splitting (NQS) sparse data decoding method using bit masks shown in FIGS. 11A and 11B. Referring to FIG. 11A, the first step in the process is to check for unprocessed blocks in the block list (810). When all the blocks in the block list have been processed the decoding of the analysis array is complete, and the next un-decoded analysis array is selected at step 694 in FIG. 9A.

After step 810, while there are unprocessed blocks in the block list, the next unprocessed block (h,w,m) is selected at step 812. If the selected block is a 1×1 block then the value of the coefficient, V(i,j), is set equal to $2^{B(i,j)-1}$ plus the value of the next (B(i,j)−1) bits, and one bit for sgn(i,j) (step 816). After step 814, if the block is not the minimum block size, then the bit mask is decoded (step 818), and the procedure continues with step 850 in FIG. 11B.

FIG. 11B illustrates the bit mask remainder decoding procedure. First the sub-block number (I) is set equal to one (step 850). The sub-block decoding procedure begins at step 852, with a check if all the sub-blocks have been decoded. Next, if the selected mask bit V(I) does not equal one (step 854), then the difference B(h,w,m)−1−$B_I$ is decoded, and the value of $B_I$ is determined (step 856). If $B_I$ does not equal zero (step 858) then the $I^{th}$ sub-block is added to the block list (step 860). If $B_I$ equals zero (step 858) then the sub-block number is incremented by one and the sub-block process returns to the beginning of the loop to step 852. After all four sub-blocks have been processed the decoding procedure continues with step 810 in FIG. 11A (step 880).

Figure 9B:
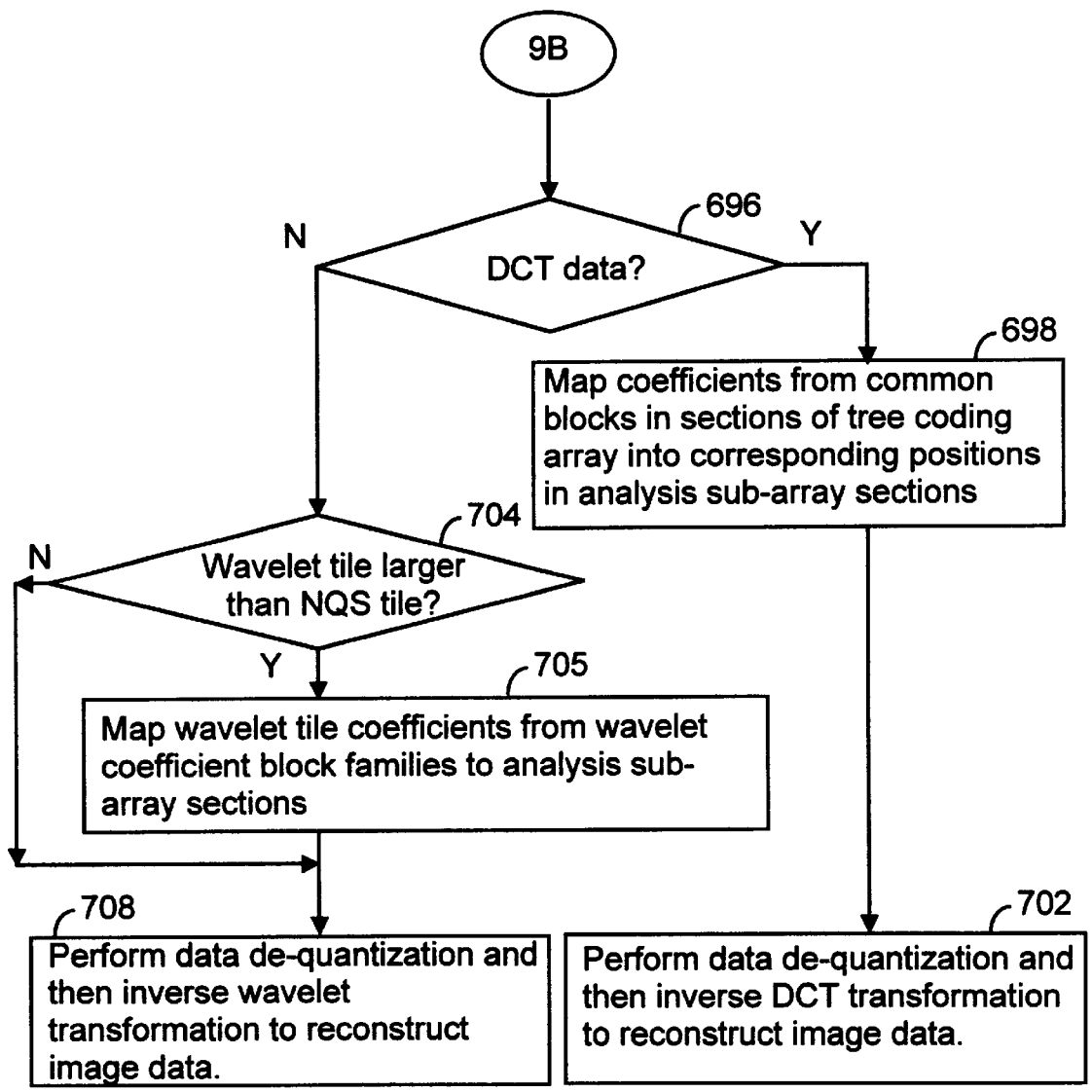

After all of the blocks in the analysis arrays have been decoded (step 694), the decoding procedure continues with the coefficient mapping procedure shown in FIG. 9B. If the data is DCT data (step 696), the coefficients are mapped from the common blocks in the tree coding array sections into corresponding positions in the analysis sub-array sections (step 698). The coefficient mapping process in step 698 is performed on each of the analysis arrays in the image. Lastly, a data de-quantization procedure is performed and then an inverse DCT transformation is applied to reconstruct the image data (step 702).

If the data is not DCT data (696-N), then if the wavelet transform tile size is not larger than the NQS tile size (step 704), then the procedure continues at step 706. Otherwise, the wavelet tile coefficients are mapped from the wavelet block families into analysis sub-array sections (step 705). Lastly, a data de-quantization procedure is performed and then an inverse wavelet transformation is applied to reconstruct the image data (step 708).

When DCT data is being decoded, steps 696, 698 and 702 may be performed at the end of the analysis array decoding procedure, instead after the main decoding loop. Similarly, steps 704 and 705 could be performed at the end of the analysis array decoding procedure. However, unless the wavelet tile size is the same as the analysis array size, the inverse wavelet transformation would have to be performed after all the analysis arrays have been decoded.

After the image data is reconstructed, it may be stored as a file, displayed on a display device, printed, and/or used or processed in any of the ways that digitally stored images are used or processed.

Alternate Embodiments

The present invention can be implemented as a computer program product that includes a computer program mechanism embedded in a computer readable storage medium. For instance, the computer program product could contain the program modules shown in FIG. 1. These program modules may be stored on a CDROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of encoding a first data array having a plurality of coefficients comprising the steps of:

mapping the first data array coefficients into a plurality of data blocks in a second data array so as to group similarly valued coefficients into common data blocks;

defining a plurality of data block families in the second data array, each data block family comprising a plurality of data blocks;

tree type coding maximum numbers of bits required to represent any single coefficient in the data block families; and encoding data blocks having a non-zero maximum number of bits required to represent any single coefficient in the data block using a sparse data encoding method;

wherein when the first data array is an array of DCT data, the first data array comprises a plurality of 8×8 sub-arrays and the mapping step further comprises grouping coefficients from corresponding positions in each of the plurality of 8×8 sub-arrays into respective contiguous sections of the second data array.

2. A method of encoding a first data array having a plurality of coefficients comprising the steps of:

mapping the first data array coefficients into a plurality of data blocks in a second data array so as to group similarly valued coefficients into common data blocks;

defining a plurality of data block families in the second data array, each data block family comprising a plurality of data blocks;

tree type coding maximum numbers of bits required to represent any single coefficient in the data block families; and encoding data blocks having a non-zero maximum number of bits required to represent any single coefficient in the data block using a sparse data encoding method;

wherein when the first data array is an array of DCT data, the first data array comprises a plurality of 8×8 sub-arrays and the mapping step further comprises grouping coefficients from corresponding positions in each of the plurality of 8×8 sub-arrays into respective contiguous sections of the second data array; and the step of grouping coefficients further comprises the steps of:

mapping coefficients from predefined first sections of the 8×8 sub-arrays of the first data array into a predefined first section of the second data array, mapping 1×1 data blocks from corresponding positions in predefined second sections of the 8×8 sub-arrays into common data blocks in a predefined second section of the second data array, mapping 2×2 data blocks from corresponding positions in the third sections of the 8×8 sub-arrays into common data blocks in a predefined third section of the second data array, mapping 4×4 data blocks from corresponding positions in the fourth sections of the 8×8 sub-arrays into common data blocks in a predefined fourth section of the second data array, wherein the first, second, third and fourth sections of the 8×8 sub-arrays are contiguous and non-overlapping, and wherein the first, second, third and fourth sections of the second data array are contiguous and non-overlapping.

3. The method of claim 2 wherein the first section of each 8×8 sub-arrays of the first data array comprises a 1×1 data block at the upper leftmost corner of the first data array, the second section comprises three 1×1 data blocks adjacent to the first section of the 8×8 subarray, the third section of the 8×8 subarray comprises three 2×2 data blocks adjacent to the second section of the 8×8 subarray, the fourth section of the 8×8 subarray comprises three 4×4 data blocks adjacent to the third section of the 8×8 subarray; and wherein the first section of the second data array comprises a 4×4 data block at the upper leftmost corner of the second data array, the second section of the second data array comprises three 4×4 data blocks adjacent to the first section, the third section of the second data array comprises three 8×8 data blocks adjacent to the second section of the second data array, the fourth section of the second data array comprises three 16×16 sections adjacent to the third section of the second data array.

4. The method of claim 2 further comprising the step of differential pulse code modulation encoding DC coefficients of the data blocks.

5. The method of claim 1 wherein the mapping the first data array coefficients step further comprises, when the first data array is an array of wavelet data larger than a first predetermined size, mapping the first data array coefficients into a plurality of data blocks in the second data array so as to group coefficients from a common wavelet family into a common data block.

6. The method of claim 1 wherein the tree type coding step further comprises the steps of:

determining, for each of the data block families, a first maximum number of bits required to represent any single coefficient in the data block family;

determining a second maximum number of bits required to represent any single coefficient in all of the data block families;

computing, for each data block family, a difference between the second maximum number and the first maximum number;

dividing each block family with a non-zero first maximum number into a first block and a sub-family, determining a sub-family maximum number of bits required to represent any single coefficient in the sub-family, computing the difference between the block family first maximum and the sub-family maximum;

dividing successively each sub-family (parent sub-family) into a first block and a child sub-family, determining a child sub-family maximum number of bits required to represent any single coefficient in the child sub-family, computing the difference between the parent sub-family maximum and the child sub-family maximum, and for each parent sub-family where the parent sub-family maximum equals the child sub-family maximum, computing a parent-block difference between the parent sub-family maximum and a maximum number of bits required to represent any single coefficient in the first block of the parent sub-family; and encoding the second maximum number, the difference between the second maximum number and the first maximum number for each data block family, and, for each data block family with a non-zero first maximum number, encoding the difference values of the parent and child sub-family maximum numbers, and encoding the parent-block difference values.

7. The method of claim 6 wherein the encoding the second maximum number step further comprises encoding using a variable length coding method.

8. The method of claim 6 wherein the encoding the second maximum number step further comprises encoding using Huffman coding.

9. The method of claim 6 wherein the encoding the second maximum number step further comprises encoding using an adaptive variable length coding method.

10. The method of claim 1 wherein the step of encoding data blocks further comprises encoding data blocks using a nested quadratic splitting encoding method.

11. The method of claim 10 wherein the step of encoding data blocks further comprises encoding data blocks using a nested quadratic splitting encoding method that includes bit mask coding.

12. The method of claim 11 wherein the nested quadratic splitting encoding method further comprises:

successively selecting successively smaller blocks of data within the first data array, wherein the data blocks are selected in a predefined order;

processing each selected data block by:

determining whether the selected data block contains more than a predefined threshold number of data values;

when the selected data block contains more than a predefined threshold number of data values:

dividing the selected data block into four subblocks;

entering a first value in a bit mask for each subblock for which the maximum number of bits required to represent any single coefficient in the subblock is equal to the maximum number for the selected data block;

entering a second value in a bit mask for subblock for which the maximum number of bits required to represent any single coefficient in the subblock is not equal to the maximum number for the selected data block;

encoding the bit mask;

encoding a difference between the maximum number for the selected data block and each subblock whose maximum number is not equal to the maximum number for the selected data block;

when the selected data block contains less than the predefined threshold number of data values outputting bits indicating the values of the coefficients in the selected data block.

13. The method of claim 12 wherein the encoding the bit mask further comprises encoding using a variable length coding method.

14. The method of claim 1 wherein the tree type coding step further comprises the steps of:
   determining, for each of the data block families, a first maximum number of bits required to represent any single coefficient in the data block family;
   determining a second maximum number of bits required to represent any single coefficient in all of the data block families;
   computing, for each data block family, a difference between the second maximum number and the first maximum number;
   generating, for a set of subblocks of a selected data block, a bit mask comprising a plurality of bit mask entries for the subblocks, wherein each bit mask entry is set equal to a first value in when the maximum number of bits required to represent any single coefficient in a respective subblock is equal to the maximum number for the selected data block and each bit mask entry is set equal to a second value when the maximum number of bits required to represent any single coefficient in the respective subblock is not equal to the maximum number for the selected data block;
   encoding the bit mask; and
   encoding a difference between the maximum number for the selected data block and each subblock whose maximum number is not equal to the maximum number for the selected data block.

15. A unified method of encoding a first data array having a plurality of coefficients comprising the steps of:
   when the first data array is an array of DCT data:
      mapping the first data array DCT coefficients into a plurality of data blocks in a second data array so as to group similarly valued coefficients into common data blocks;
      defining a plurality of data block families in the second data array, each data block family comprising a plurality of data blocks;
      encoding maximum numbers of bits required to represent any single coefficient in the data block families; and
      encoding data blocks having a non-zero maximum number of bits required to represent any single coefficient in the data block using a sparse data encoding method;
   when the first data array is an array of wavelet data larger than a first predetermined size:
      mapping the first data array wavelet coefficients into a plurality of data blocks in a second data array so as to group similarly valued coefficients into common data blocks;
      defining a plurality of data block families in the second data array, each data block family comprising a plurality of data blocks;
      encoding maximum numbers of bits required to represent any single coefficient in the data block families; and
      encoding data blocks having a non-zero maximum number of bits required to represent any single coefficient in the data block using a sparse data encoding method;
   when the first data array is a square array of wavelet coefficients smaller than a second predetermined size:
      defining a plurality of block families in the first data array, each block family comprising a plurality of blocks; and
      encoding the blocks using a nested quadratic splitting encoding method.

16. The method of claim 15 wherein the mapping the first data array wavelet coefficients step further comprises mapping the first data array wavelet coefficients into a plurality of data blocks in the second data array so as to group wavelet coefficients from a common wavelet family into a common data block.

17. The method of claim 15 wherein the first data array of DCT coefficients comprises a plurality of 8×8 sub-arrays and the mapping step further comprises grouping DCT coefficients from corresponding positions in the 8×8 sub-arrays into sections of the second data array.

18. The method of claim 17 wherein the step of grouping DCT coefficients further comprises the steps of:
   mapping DCT coefficients from predefined first sections of the 8×8 sub-arrays of the first data array into a predefined first section of the second data array, mapping 1×1 data blocks from corresponding positions in predefined second sections of the 8×8 sub-arrays into common data blocks in a predefined second section of the second data array, mapping 2×2 data blocks from corresponding positions in the third sections of the 8×8 sub-arrays into common data blocks in a predefined third section of the second data array, mapping 4×4 data blocks from corresponding positions in the fourth sections of the 8×8 sub-arrays into common data blocks in a predefined fourth section of the second data array, wherein the first, second, third and fourth sections of the 8×8 sub-arrays are contiguous and non-overlapping, and wherein the first, second, third and fourth sections of the second data array are contiguous and non-overlapping.

19. A computer program product for use in conjunction with a computer system, the computer program product comprising a computer readable storage medium and a computer program mechanism embedded therein, the computer program mechanism comprising instructions for a data encoding procedure for encoding a first data array having a plurality of coefficients, the data encoding procedure including instructions for:
   mapping the first data array coefficients into a plurality of data blocks in a second data array so as to group similarly valued coefficients into common data blocks;
   defining a plurality of data block families in the second data array, each data block family comprising a plurality of data blocks;
   encoding maximum numbers of bits required to represent any single coefficient in the data block families; and
   encoding data blocks having a non-zero maximum number of bits required to represent any single coefficient in the data block using a sparse data encoding method;
   wherein when the first data array is an array of DCT data, the first data array comprises a plurality of 8×8 sub-arrays and the mapping step further comprises grouping coefficients from corresponding positions in each of the plurality of 8×8 sub-arrays into respective contiguous sections of the second data array.

20. The computer program product of claim 19 wherein the instructions for grouping coefficients further comprise instructions for:

mapping coefficients from predefined first sections of the 8×8 sub-arrays of the first data array into a second data array predefined first section of the second data array, mapping 1×1 data blocks from corresponding positions in predefined second sections of the 8×8 sub-arrays into common data blocks in a predefined second section of the second data array, mapping 2×2 data blocks from corresponding positions in the third sections of the 8×8 sub-arrays into common data blocks in a predefined third section of the second data array, mapping 4×4 data blocks from corresponding positions in the fourth sections of the 8×8 sub-arrays into common data blocks in a predefined fourth section of the second data array, wherein the first, second, third and fourth sections of the 8×8 sub-arrays are contiguous and non-overlapping, and wherein the first, second, third and fourth sections of the second data array are contiguous and non-overlapping.

21. The computer program product of claim 19 wherein the mapping the first data array coefficients instructions further comprise instructions for, when the first data array is an array of wavelet data larger than a first predetermined size, mapping the first data array coefficients into a plurality of data blocks in the second data array so as to group coefficients from a common wavelet family into a common data block.

* * * * *